United States Patent
Shimada

(10) Patent No.: US 10,315,489 B2
(45) Date of Patent: Jun. 11, 2019

(54) WORK VEHICLE

(71) Applicant: Yanmar Co., Ltd., Osaka-shi, Osaka-fu (JP)

(72) Inventor: Takayuki Shimada, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/576,175

(22) PCT Filed: Mar. 22, 2016

(86) PCT No.: PCT/JP2016/059061
§ 371 (c)(1),
(2) Date: Nov. 21, 2017

(87) PCT Pub. No.: WO2016/189939
PCT Pub. Date: Dec. 1, 2016

(65) Prior Publication Data
US 2018/0134115 A1 May 17, 2018

(30) Foreign Application Priority Data

May 27, 2015 (JP) .................................. 2015-108013
May 27, 2015 (JP) .................................. 2015-108014

(51) Int. Cl.
*B60H 3/00* (2006.01)
*B61D 27/00* (2006.01)
(Continued)

(52) U.S. Cl.
CPC ............ *B60H 1/00535* (2013.01); *B60H 1/00* (2013.01); *B60H 1/00207* (2013.01);
(Continued)

(58) Field of Classification Search
CPC ............ B60H 1/00207; B60H 1/00371; B60H 1/00535; B60H 1/00; B60H 1/00378;
(Continued)

(56) References Cited

U.S. PATENT DOCUMENTS

| | | | | |
|---|---|---|---|---|
| 4,926,655 A | * | 5/1990 | King .................. | B60H 1/00371 62/244 |
| 2007/0044492 A1 | | 3/2007 | Ichikawa et al. | |
| 2016/0311288 A1 | * | 10/2016 | Mayo Mayo ...... | B60H 1/00207 |

FOREIGN PATENT DOCUMENTS

| | | |
|---|---|---|
| JP | 62-055212 A | 3/1987 |
| JP | 05-042060 U | 6/1993 |

(Continued)

OTHER PUBLICATIONS

International Search Report dated Jul. 26, 2016 issued in corresponding PCT Application PCT/JP2016/059061.

*Primary Examiner* — Davis D Hwu
(74) *Attorney, Agent, or Firm* — Norton Rose Fulbright US LLP

(57) ABSTRACT

A work vehicle that facilitates attachment of an air conditioner main body, the work vehicle including an air conditioner main body arrangement part for arranging therein an air conditioner main body. The air conditioner main body arrangement part is provided in a ceiling part of a cabin covering a driver unit of the work vehicle so that the air conditioner main body arrangement part protrudes rearward from a pair of left and right rear strut pieces of the cabin. The air conditioner main body arrangement part includes a main body support member protruding rearward, which is provided to an upper rear beam piece laterally bridged between upper end portions of the pair of left and right rear strut pieces. The main body support member has support rigidity to support the air conditioner main body from below so that the air conditioner main body is mounted thereon from above.

18 Claims, 26 Drawing Sheets

(51) Int. Cl.
*B60H 1/00* (2006.01)
*B60H 1/32* (2006.01)
*B62D 49/00* (2006.01)
*B60H 1/12* (2006.01)
*B62D 25/06* (2006.01)
*B62D 33/06* (2006.01)

(52) U.S. Cl.
CPC ........... *B60H 1/00378* (2013.01); *B60H 1/12* (2013.01); *B60H 1/32* (2013.01); *B60H 1/3229* (2013.01); *B62D 25/06* (2013.01); *B62D 33/0617* (2013.01); *B62D 49/00* (2013.01); *B60H 2001/00235* (2013.01)

(58) Field of Classification Search
CPC .......... B60H 1/12; B60H 1/32; B60H 1/3229; B60H 2001/00235; B62D 25/08; B62D 25/06; B62D 49/00
USPC .......................................................... 165/42
See application file for complete search history.

(56) References Cited

FOREIGN PATENT DOCUMENTS

| JP | 2000-219029 A | 8/2000 |
|----|---------------|--------|
| JP | 2002-068026 A | 3/2002 |
| JP | 2004-243827 A | 9/2004 |
| JP | 2007-062573 A | 3/2007 |
| JP | 2008-207802 A | 9/2008 |
| JP | 2010-215024 A | 9/2010 |
| JP | 2012-176683 A | 9/2012 |

\* cited by examiner

WORK VEHICLE

CROSS REFERENCES TO RELATED APPLICATIONS

This application is a national stage application pursuant to 35 U.S.C. § 371 of International Application No. PCT/JP2016/059061, filed on Mar. 22, 2016, which claims priority under 35 U.S.C. § 119 to Japanese Patent Application Nos. 2015-108013 and 2015-108014, both filed on May 27, 2015, the disclosures of which are hereby incorporated by reference in their entireties.

Technical Field

The present invention relates to a work vehicle, and more particularly, relates to a work vehicle having a support structure for an air conditioner main body arranged on a ceiling part of a cabin, which part covers a driver unit.

Background Art

Patent Literature (hereinafter, PTL 1) discloses a mode of the traditional work vehicle. Namely, PTL 1 (particularly, FIG. 4) discloses a structure in which an air conditioner main body is disposed in a rear portion of a ceiling part of a cabin, which part covers a driver unit of a tractor. Further, in the rear portion of the ceiling part, there is formed a space for disposing the air conditioner main body. This space is closed by a rear end portion of an inner ceiling piece, a rear end portion of an outer ceiling piece, and a rear ceiling piece. Between upper portions of a pair of left and right rear strut pieces forming a part of the cabin, a rear beam piece extended in the left-right direction is bridged, and to the front surface of the rear beam piece, the rear end edge of the inner ceiling piece is connected. In the midway portion of the rear beam piece relative to the left and right, a bracket having a bottom flame portion, a side surface portion, and a rear surface portion is provided in such a manner as to protrude rearward. On the bottom flame portion of this bracket, the air conditioner main body is placed and fixed. On the side surface portion and the rear surface portion of the bracket, a side surface portion and the rear portion of the air conditioner main body is supported and fixed. To the rear strut pieces, a front end edge portion of a rear ceiling piece is detachably attached, and a rear end edge portion of the rear ceiling piece is abutted to the rear end edge portion of the outer ceiling piece.

CITATION LIST

Patent Literature

PTL 1: Japanese Patent Application Laid-Open No. 2002-68026 (FIG. 4)

SUMMARY OF INVENTION

Technical Problem

In order to support and fix the side surface and the rear portion of the air conditioner main body to the bracket, fixing means such as bolts and the like have to be screwed from a side and from the rear for fixation. At that time, if the rear ceiling piece is attached beforehand, the rear ceiling piece becomes an obstacle for the work of screwing the bolts and the like. Further, in cases of attaching the rear ceiling piece after the air conditioner main body is fixed to the bracket, the front end edge portion of the rear ceiling piece needs to be attached to the rear strut pieces while holding upward a refrigerant guiding pipe and a drain pipe connected to the air conditioner main body, from below with the rear ceiling piece. However, due to a high ground clearance of the rear ceiling piece to be attached, the work of attaching the rear ceiling piece while supporting the refrigerant guiding pipe and the drain pipe is troublesome.

In view of the above, it is an object of the present invention to provide a work-machine that can facilitate attachment of an air conditioner main body.

Solution to Problem

An aspect 1 of the present invention is a work vehicle, in which an air conditioner main body arrangement part for arranging therein an air conditioner main body is provided in a ceiling part of a cabin covering a driver unit, in such a manner that the air conditioner main body arrangement part protrudes rearward from a pair of left and right rear strut pieces of the cabin;

the air conditioner main body arrangement part includes a main body support member protruding rearward, which is provided to an upper rear beam piece laterally bridged between upper end portions of the pair of left and right rear strut pieces;

the main body support member has support rigidity to support the air conditioner main body from below; and the main body support member enables attachment of the air conditioner main body from above.

The aspect 1 of the invention enables attachment of the air conditioner main body from above to the main body support member having supporting rigidity for supporting the air conditioner main body from below. Therefore, the air conditioner main body can be easily attached to the main body support member.

An aspect 2 of the present invention may be the invention of the aspect 1, wherein the main body support member includes a horizontal protruding surface portion which is integrally formed by rigid thin sheet metal in such a manner as to horizontally protrude, and a rising surface portion which rises upward from a rear end edge portion of the horizontal protruding surface portion; and the rising surface portion has a plurality of attachment stays horizontally protruding inward, thereby enabling attachment of the air conditioner main body from above via the plurality of stays in a bridging manner.

In the aspect 2 of the invention, the rising surface portion of the main body support member has the plurality of horizontally and inwardly protruding attachment stays. Therefore, the air conditioner main body can be attached from above in a bridging manner via the plurality of attachment stays. Thus, the work of attaching the air conditioner main body to the main body support member can be easily and reliably performed from above in a stable manner.

An aspect 3 of the present invention may be the invention of the aspect 2, wherein the air conditioner main body is structured by arranging, in a main body casing, devices and the like for generating cooled air and warmed air;

side walls of the main body casing have a plurality of outwardly protruding attachment pieces facing the attachment stays; and each of the attachment pieces is overlapped in an up-down direction with corresponding one of the attachment stays, and an attachment bolt is penetrated and screwed in the overlapping portion, in the up-down direction, thereby enabling attachment of the air conditioner main body from above to the attachment stays in a bridging manner, via the attachment pieces.

In the aspect 3 of the invention, side walls of the main body casing of the air conditioner main body have a plurality of outwardly protruding attachment pieces facing the attachment stays; and each attachment piece and each attachment stay are overlapped with each other in the up-down direction and screwed by an attachment bolt penetrating the overlapping portion in the up-down direction, thereby enabling attachment of the air conditioner main body from above in a bridging manner, to the attachment stay via the attachment pieces. Thus, the work of attachment from placing the air conditioner main body on the main body support member until fastening the bolt can be efficiently performed from above.

An aspect 4 of the present invention may be the invention of the aspect 3, wherein a space is formed between the main body support member and the air conditioner main body attached to the main body support member in a bridging manner, via the attachment stays and attachment pieces.

In the aspect 4 of the invention, a space is formed between the main body support member and the air conditioner main body, when the air conditioner main body is attached to the main body support member. Therefore, rainwater, washing water, and the like can be discharged through that space. In other words, the rainwater, washing water and the like can be prevented from being caught in the air conditioner main body and retained on the main body support member.

An aspect 5 of the present invention is a work vehicle in which a ceiling part having a hollow flat plate-shape is bridged between a pair of left and right upper beam pieces forming upper portions on left and right sides of a cabin, an air conditioner main body is arranged in the ceiling part, and supply of outside air to the air conditioner main body is enabled;

each of the upper beam pieces is formed in a cylindrical shape extended in a front-rear direction, has a communication port communicating with the ceiling part in its front portion, and has an opened rear end portion serving as an outside air introduction port, so that outside air introduced from the outside air introduction port is supplied from the communication port to the air conditioner main body in the ceiling part via each of the upper beam pieces.

In the aspect 5 of the invention, outside air introduced from the outside air introduction port is supplied from the communication port to the air conditioner main body in the ceiling part via each of the upper beam pieces. Therefore, a passage through which the outside air is supplied from the outside air introduction port to the air conditioner main body is made long. Dust contained in the outside air therefore falls in the passage, and does not flow into the air conditioner main body. As a result, it is possible to prevent a problem of dust in the outside air causing clogs in the blower fan (sirocco fan) provided in the air conditioner main body which deteriorates the air blowing function.

An aspect 6 of the present invention may be the invention of the aspect 5, wherein the air conditioner main body is arranged in a rear portion of the ceiling part;

an outside air supply passage is interposed between the outside air introduction port and the air conditioner main body;

the outside air supply passage is bent in a folding manner so that outside air introduced from the outside air introduction port is supplied from the communication port to the air conditioner main body arranged in the rear portion of the ceiling part, via each of the upper beam pieces.

In the aspect 6 of the invention, the outside air supply passage interposed between the outside air introduction port and the air conditioner main body is bent in a folding manner so that outside air introduced from the outside air introduction port is supplied from the communication port to the air conditioner main body arranged in the rear portion of the ceiling part, via each of the upper beam pieces. This enables formation of a further longer outside air supply passage. Therefore, the actions and effects of the invention of the aspect 1 can be ensured.

An aspect 7 of the present invention may be the invention of the aspect 6, wherein the ceiling part has therein the air conditioner main body arranged in the rear portion thereof, and an air supply duct formed by being extended forward from the air conditioner main body; and in the air supply duct, an air supply passage communicating with introduction passages formed in the pair of left and right upper beam pieces having a cylindrical shape is provided, and a pair of left and right outside air supply passages are formed by the pair of left and right introduction passages and the air supply passage.

In the aspect 7 of the invention, in the air supply duct, an air supply passage communicating with introduction passages formed in the pair of left and right upper beam pieces having a cylindrical shape, and a pair of left and right outside air supply passages are formed by the pairs of left and right outside air introduction passages and the air supply passage. Therefore, the pair of left and right outside air supply passages can be formed compact, while ensuring the amount of outside air taken in via the pair of left and right outside air supply passages.

An aspect 8 of the present invention may be the invention of any one of the aspects 5 to 7, wherein the ceiling part is formed by an inner ceiling piece, an outer ceiling piece, and a rear ceiling piece interposed between rear end edge portions of both the inner and outer ceiling pieces;

the rear end portions of the pair of left and right beam pieces and the main body support member are covered by the rear ceiling piece;

an upper end edge portion of the rear ceiling piece is overlapped with the rear end edge portion of the outer ceiling piece, in such a manner as to enable taking-in of outside air via a gap formed in the overlapped portion, and the outside air taken in is introduced to the outside air introduction port opened to the rear end portion of each of the upper beam pieces, through a space formed between the main body support member and the rear ceiling piece.

In the aspect 8 of the invention, the upper end edge portion of the rear ceiling piece, which covers the rear end portions of the pair of left and right upper beam pieces and the main body support member, is overlapped with the rear end edge portion of the outer ceiling piece, in such a manner as to enable taking-in of the outside air via the gap formed in the overlapped portion. The outside air taken in is introduced, via the space formed between the main body support member and the rear ceiling piece, to the outside air introduction port opened in the rear end portion of each of the upper beam pieces. Therefore, even if rain water, high-pressure cleaning water, and the like enter the gap, the rain water, the high-pressure cleaning water, and the like can be reliably prevented from entering from the outside air introduction ports to the outside air supply passage.

An aspect 9 of the present invention may be the invention of any one of the aspects 5 to 8, wherein the air conditioner main body includes a main body casing, an evaporator configured to generate cooled air in the main body casing, a heater core configured to generate warmed air in the main body casing, and a blower fan configured to suck in outside air into the main body casing, and feeding the air to the evaporator and the heater core;

a base end opening portions of a plurality of air feeding ducts are connected in an interlocking manner to the main body casing; and one of the base end opening portions is arranged nearby the heater core and is capable of taking in warmed air, and the other one of the base end opening portions is arranged nearby the evaporator and is capable of taking in cooled air.

In the aspect 9 of the invention, a base end opening portions of a plurality of air feeding ducts are connected in an interlocking manner to the main body casing; and one of the base end opening portions is arranged nearby the heater core and is capable of taking in warmed air, and the other one of the base end opening portions is arranged nearby the evaporator and is capable of taking in cooled air. Therefore, air feeding ducts for separately feeding the warmed air and the cooled air can be arranged, and the warmed air or the cooled air can be blown out from desirable positions of the cabin through the air feeding ducts.

An aspect 10 of the present invention may be the invention of the aspect 9, wherein the air feeding duct for supplying warmed air is extended in a front-rear direction in the ceiling part, and its leading end opening portion is formed nearby a front window part of the cabin, to enable blowing of warmed air from the leading end opening portion towards the front window part; and the air feeding duct for supplying cooled air is extended in the front-rear direction in the ceiling part, and its leading end opening portion is formed in a midway portion of the ceiling part, to enable blowing of cooled air from the leading end opening portion towards an operator seated in the driver unit in the cabin.

In the aspect 10 of the invention, since the warmed air can be blown out towards the front window part, this warmed air can be functioned as a defroster. Further, since the cooled air can be blown out towards the operator seated in the driver unit in the cabin, the cooled air can prevent the operator from feeling dizzy due to heat in the warmed cabin. In other words, a comfortable working environment that keeps operators head cool and his/her feet warm can be realized in the cabin.

An aspect 11 of the present invention may be the invention of the aspect 10, wherein a pair of air feeding ducts for supplying warmed air and a pair of air feeding ducts for supplying cooled air are arranged side-by-side, on the left and right sides of the rearward conveying portion;

the pair of air feeding ducts for supplying the warmed air are arranged close to the rearward conveying portion and cross directly below the branch intake portions in a three-dimensional crossing manner, and their leading end opening portions are arranged nearby the front window part of the cabin;

the pair of air feeding ducts for supplying the cooled air are arranged close to the upper beam pieces, and their leading end opening portions are arranged nearby the branch intake portions.

In the aspect 11 of the invention, the pair of air feeding ducts for supplying the warmed air are arranged close to the rearward conveying portion and cross directly below the branch intake portions in a three-dimensional crossing manner, and their leading end opening portions are arranged nearby the front window part of the cabin. Further, the pair of air feeding ducts for supplying the cooled air are arranged close to the upper beam pieces, and their leading end opening portions are arranged nearby the branch intake portions. Therefore, the air supply duct and the air feeding ducts are arranged compactly in the ceiling part. This way, the ceiling part can be formed in a flat hollow plate shape, and a large residential space can be ensured in the cabin while restraining an increase in the vehicle height.

An aspect 12 of the present invention may be the invention of the aspect 10 or 11, wherein each of the air feeding ducts for supplying warmed air and each of the air feeding ducts for supplying cooled air have their base end opening portions arranged close to each other, and a feed amount adjustment member is arranged nearby these base end opening portions in a swing-adjustable manner, so that the feed amounts of warmed air and cooled air are adjusted in a reciprocal manner by the feed amount adjustment member.

In the aspect 12 of the invention, since the feed amounts of the warmed air and the cooled air is reciprocally adjusted by the feed amount adjustment member, the feed amounts of the warmed air and the cooled air can be easily adjusted.

Advantageous Effects of Invention

The present invention can provide a work-machine that can facilitate attachment of an air conditioner main body.

DESCRIPTION OF EMBODIMENT

Figure 1:
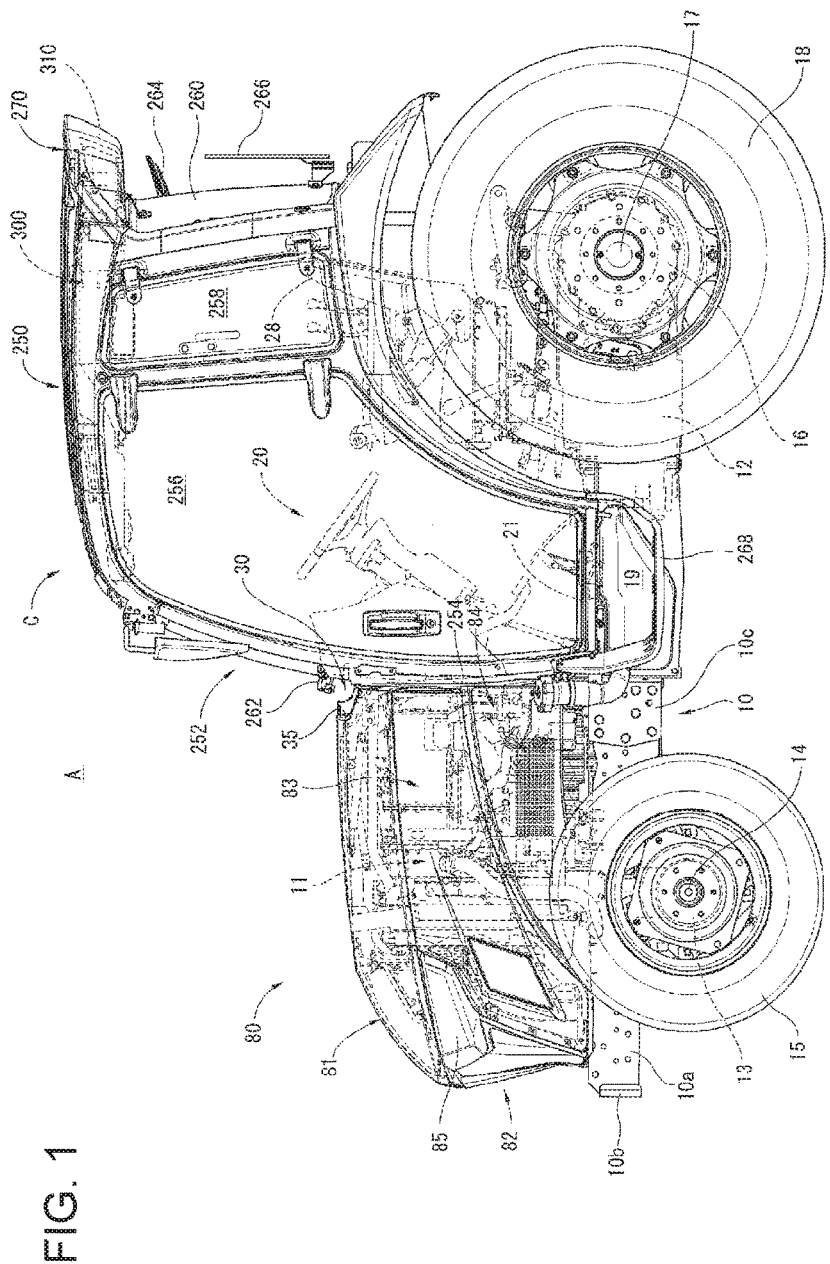
FIG. 1 A side view of a tractor of an embodiment.
Figure 2:
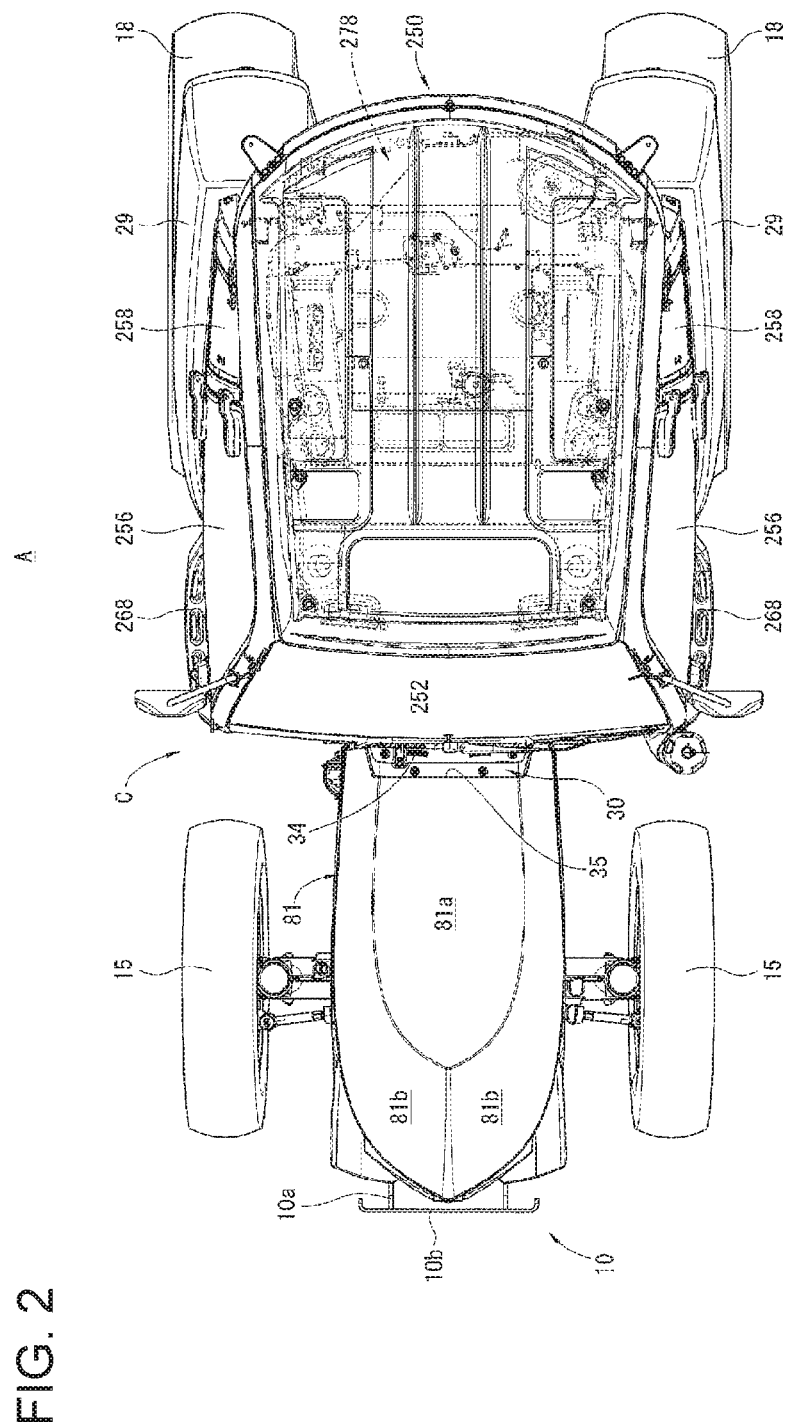
FIG. 2 A plan view of the tractor of the embodiment.
Figure 3:
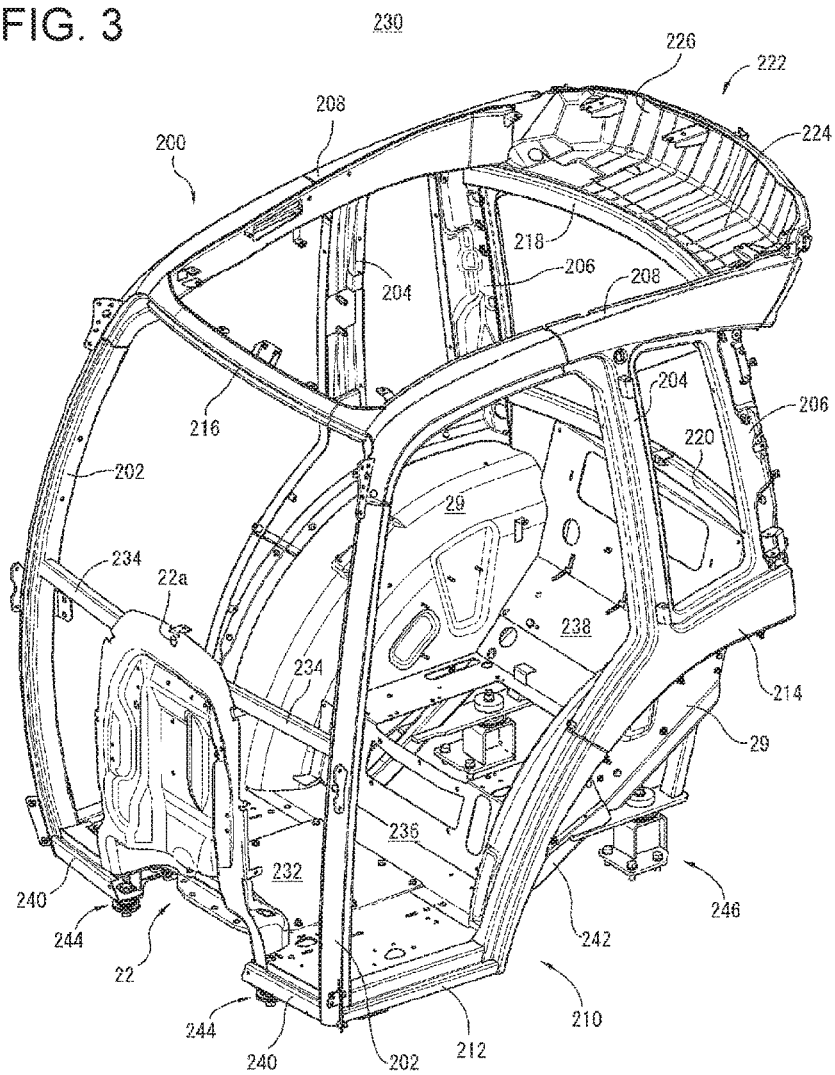
FIG. 3 An explanatory diagram providing a perspective view of a rear portion strength member seen from a front upper left direction.
Figure 4:
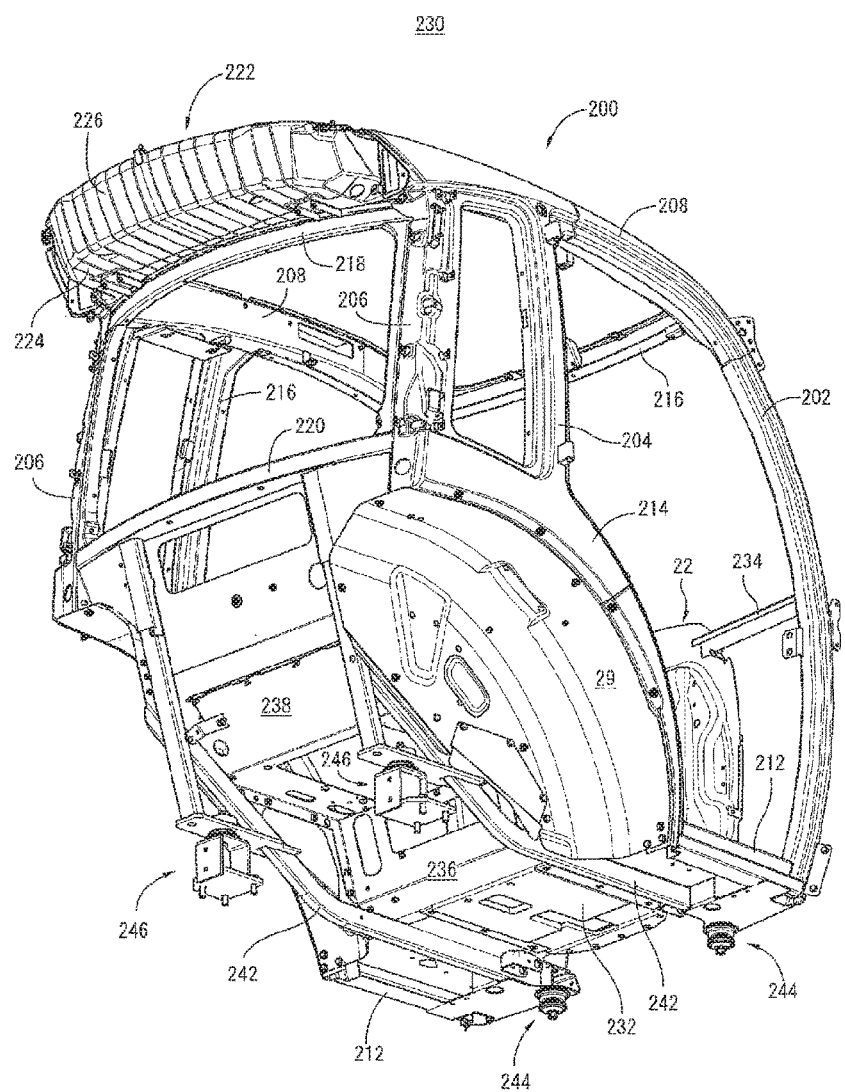
FIG. 4 An explanatory diagram providing a perspective view of the rear portion strength member seen from a rear lower right direction.

An embodiment of the present invention will be described hereinbelow with reference to the drawings. The reference symbol A in FIG. 1 and FIG. 2 is a cabin type tractor which is a mode of a work vehicle. In the following, the overall structure of the tractor A is described. Subsequently, characteristic structures of the tractor A are described. Then, the other structures of the tractor A are described.

[Overall Structure of Tractor]

In the tractor A as shown in FIG. 1 and FIG. 2, a motor unit 11 is provided in a front portion of a machine frame 10 which is a frame extended in a front-rear direction. In a rear end portion of the machine frame 10, a transmission case 12 is provided. The motor unit 11 and the transmission case 12 are interlockingly connected to each other via a power transmission shaft (not shown). To the front portion of the machine frame 10, a front axle case 13 whose axis is oriented in a left-right direction is attached. To left and right side end portions of the front axle case 13, front wheels 15 are attached through a front wheel shaft 14. Further, on the left and right side portion of the transmission case 12, rear axle cases 16 are attached, respectively. To each of the rear axle cases 16, a rear wheel 18 is interlockingly connected via a rear wheel shaft 17. The transmission case 12 and the front axle case 13 are interlockingly connected to each other via a front wheel drive shaft (not shown), thus enabling four-wheel drive which drives front and rear wheels 15 and 18. The reference numeral 19 indicates a fuel tank.

On a machine frame 10 of the tractor A, a driver unit 20 is arranged immediately rearward of the motor unit 11, and the driver unit 20 is covered by a cabin C.

(Structure of Cabin)

As shown in FIG. 1, FIG. 2, FIG. 6, and FIG. 7, the cabin C is structured by a cabin frame 200 which is a frame in a shape of a hexahedron, and planar parts interposed between pieces forming the cabin frame 200.

Figure 6:
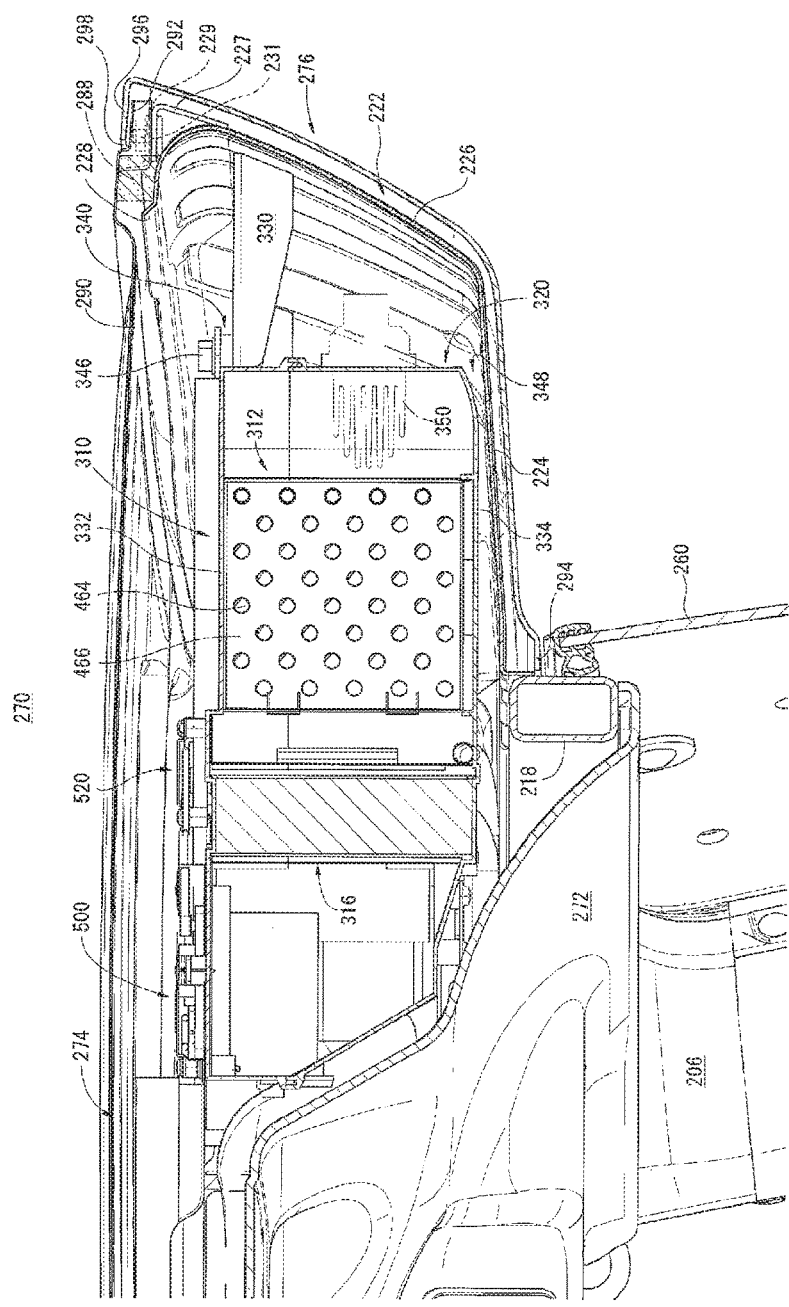
FIG. 6 A middle cross-sectional side view of an air conditioner main body arrangement part.
Figure 7:
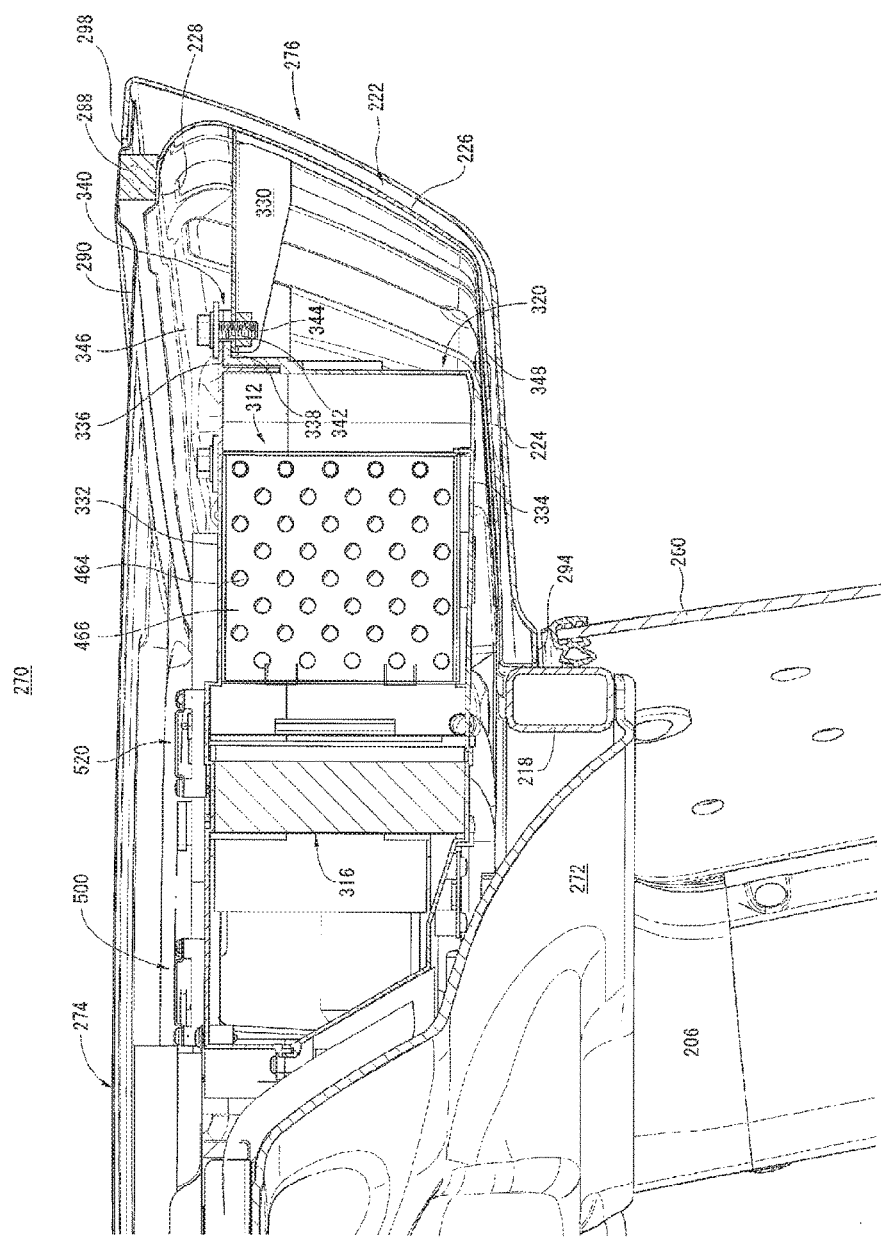
FIG. 7 A right cross-sectional side view of the air conditioner main body arrangement part.

That is, as shown in FIG. 6 and FIG. 7, in the cabin frame 200, pairs of left and right front strut pieces 202, midway strut pieces 204, and rear strut pieces 206 each extended in an up-down direction are arranged spaced from one another in the front-rear direction. Between upper end portions of these strut pieces 202, 204, and 206, a pair of left and right upper beam pieces 208 extending in the front-rear direction are laid. Between lower end portions of the strut pieces 202, 204, and 206, a pair of left and right lower beam pieces 210 extended in the front-rear direction are bridged.

The pair of left and right lower beam pieces 210 have lower beam piece front portions 212 formed horizontally linear along left and right edge portions of a floor surface portion 21, respectively, and lower beam piece rear portions 214 curved along top surfaces of a pair of left and right fenders 29, respectively. Between the upper end portions of the pair of left and right front strut pieces 202, a front beam piece 216 which extends in a left-right direction is laterally bridged. On the other hand, between the upper end portions of the pair of left and right rear strut pieces 206, an upper rear beam piece 218 which extends in a left-right direction and which is curved to protrude rearward is laterally bridged. Between the lower end portions of the pair of left and right rear strut pieces 206, a lower rear beam piece 220 is laterally bridged which extends in a left-right direction and which is curved to protrude rearward so as to have a shape identical to that of the upper rear beam piece 218.

Between the rear ends of the pair of left and right upper beam pieces 208, a main body support member 222 which is curved to protrude rearward along the upper rear beam piece 218 is bridged. The main body support member 222 has: a horizontal protruding surface portion 224 in a protruded belt-like form, which is curved along the upper rear beam piece 218; a rising surface portion 226 which rises upward from the rear end edge portion of the horizontal protruding surface portion 224; and a forward-extending surface portion 228 which is bent and extends forward from the upper end edge portion of the rising surface portion 226. These portions are integrally formed by rigid thin sheet metal.

The cabin frame 200 formed in this way forms a part of a rear portion strength member 230. The rear portion strength member 230, as shown in FIG. 6 and FIG. 7, has a floor plate 232 which is a horizontal plane constituting a main body of the floor surface portion 21, between the pair of left and right lower beam piece front portions 212 forming a part of the cabin frame 200.

On the top surface of the floor plate 232, a mat (not shown) is placed in a tense state to form the floor surface portion 21. In a middle portion of the front edge of the floor plate 232, a shielding plate 22 is provided upright for shielding the motor unit 11 and the driver unit 20 from each other.

The shielding plate 22 is formed in the shape and size minimum necessary for covering the entire back side of the motor unit 11, and prevents the heat generated by the motor unit 11 from radiating on the side of the driver unit 20. The upper left and right sides of the shielding plate 22 and the midway portions of the pair of left and right front strut piece 202, a pair of left and right reinforcing pieces 234 extending in the left-right direction are interposed.

To the rear end edge portion of the floor plate 232, the front end edge portion of a support frame face plate 236, which is formed in a form of stepped protrusion is connected. A driver seat 28 is placed on the transmission case 12 with the support frame face plate 236 interposed therebetween. To the rear end edge portion of the support frame face plate 236, a back face plate 238 is extended and stretched in such a manner as to have its front portion lowered and its rear portion raised, towards the lower rear beam piece 220. Between the left and right side edge portions of the support frame face plate 236 and the back face plate 238 and the pair of left and right lower beam piece rear portions 214, a pair of left and right fenders 29 are interposed, respectively.

In the left and right front portions of the floor plate 232, a pair of left and right lower front sideway pieces 240 extended in the left-right direction are laterally bridged between the left and right side lower end portions of the shielding plate 22 and the lower end portion of the front strut piece 202. Between the inner end portions of the pair of left and right lower front sideway pieces 240 and a midway portion of the lower rear beam piece 220, a pair of left and right floor surface beams 242 curved in a shape of protruding downward, along the floor plate 232, the support frame face plate 236, and the back face plate 238 are disposed. The pair of left and right floor surface beams 242 support from below the floor plate 232, the support frame face plate 236, and the back face plate 238. The reference numeral 244 denotes a pair of left and right front vibration isolators attached to the inner under surfaces of the pair of right and left lower front sideway pieces 240. Further, the reference numeral 246 denotes a rear vibration isolator provided in a midway portion of the pair of left and right floor surface beams 242.

The rear portion strength member 230 structured as described above, when placed on the machine frame 10 through the pair of left and right front vibration isolators 244 and the pair of left and right rear vibration isolator 246, makes the cabin C a vibration isolated structure.

The cabin C is structured as shown in FIG. 1. That is, a ceiling part 250 formed in a flat box shape extends over a ceiling plane portion framed by the pair of left and right upper beam pieces 208, the front beam piece 216, the upper rear beam piece 218, and the main body support member 222.

A front window part 252 extends over a front surface upper portion framed by the pair of left and right front strut pieces 202, the front beam pieces 216, and the pair of left and right reinforcing pieces 234. Further, a pair of left and right front wall parts 254 extends over a front surface lower portion framed by the pair of left and right front strut pieces 202, the pair of left and right reinforcing pieces 234, and the pair of left and right lower front sideway pieces 240.

A pair of left and right boarding door parts 256 are provided in such a manner as to open and close, over left and right side surface portions framed by the pairs of left and right front strut pieces 202, the midway strut piece 204, the upper beam piece 208, and the lower beam piece 210. On left and right side surface portions framed by the pairs of left and right midway strut pieces 204, the rear strut pieces 206, the upper beam pieces 208, and the lower beam pieces 210, a pair of left and right side window parts 258 are provided so as to open and close. A rear window part 260 extends in such a manner as to open and close, over the rear surface portion surrounded by the pair of left and right rear strut pieces 206, the upper rear beam piece 218, and the lower rear beam piece 220. The reference numeral 259 denotes a side-window opening/closing handle, the reference numeral 262 denotes a front wiper, the reference numeral 264 denotes a rear wiper, the reference numeral 266 denotes a low speed mark, and the reference numeral 268 denotes a boarding step.

The ceiling part 250 is provided with an air conditioner main body arrangement part 270 which protrudes rearward of the pair of left and right rear strut pieces 206. The air conditioner main body arrangement part 270 is supported by the rear ceiling piece 222. Inside the air conditioner main body arrangement part 270, an air conditioner main body 310 constituting a part of an air conditioner device 300 is arranged. The air conditioner device 300 has the air conditioner main body 310, an air conditioner condenser 49, an air conditioner compressor 59, a receiver dryer 51, and the like.

In a middle lower portion of the front window part 252, a base portion of the front wiper 262 is attached via a wiper attachment hole 22a provided in the upper end portion of the shielding plate 22.

(Structure of Ceiling Part)

Figure 5:
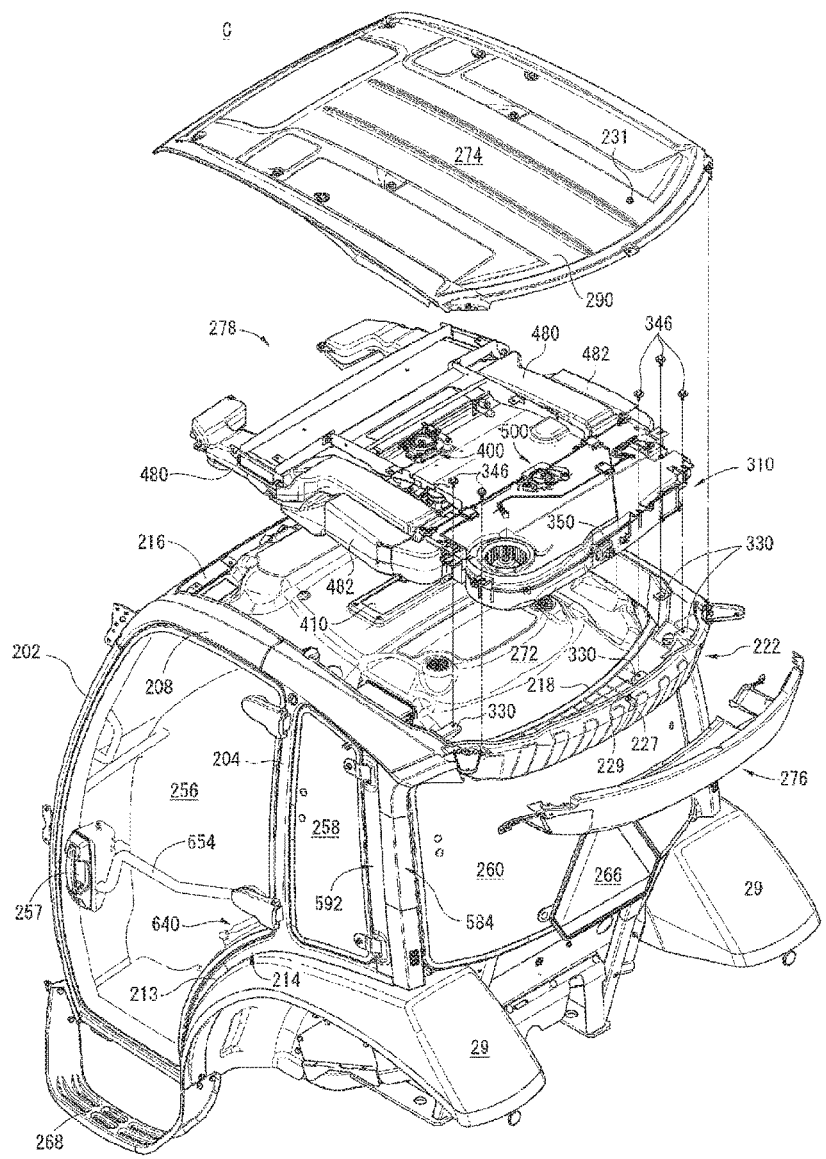
FIG. 5 An explanatory diagram providing an exploded perspective view of an engine hood.
Figure 8:
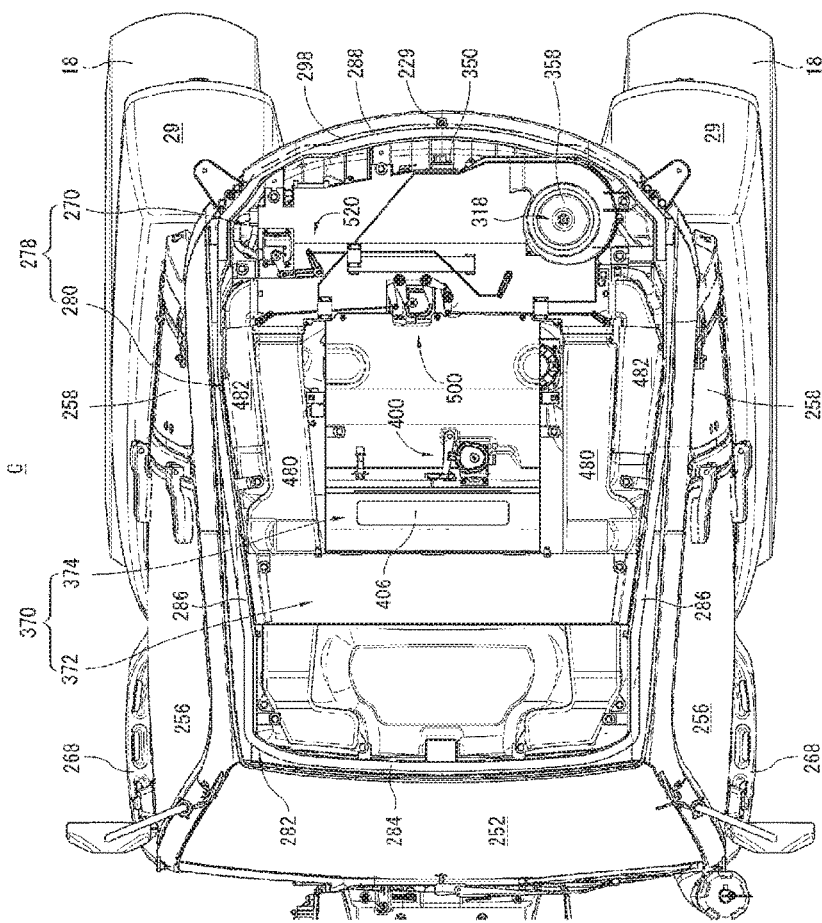
FIG. 8 A plan view of a cabin having a ceiling main body.
Figure 9:
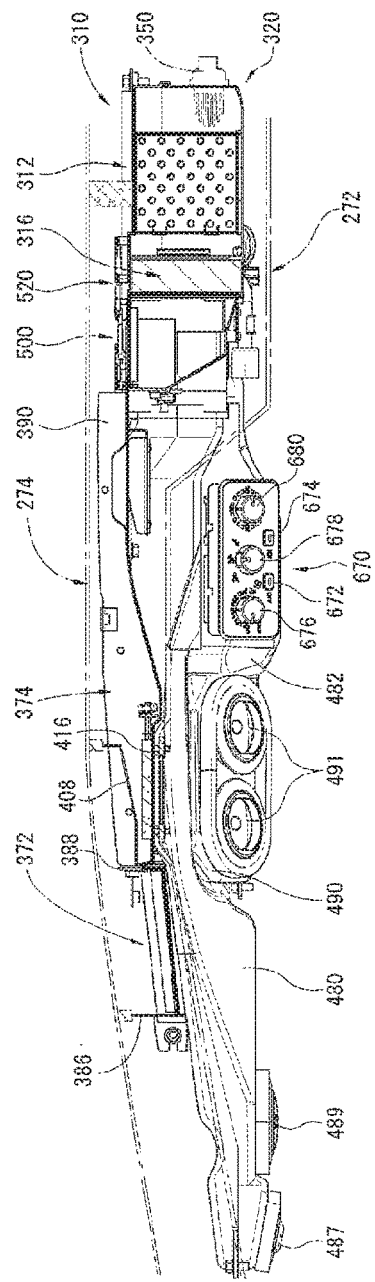
FIG. 9 An explanatory diagram providing a cross-sectional side view of the ceiling main body.
Figure 10:
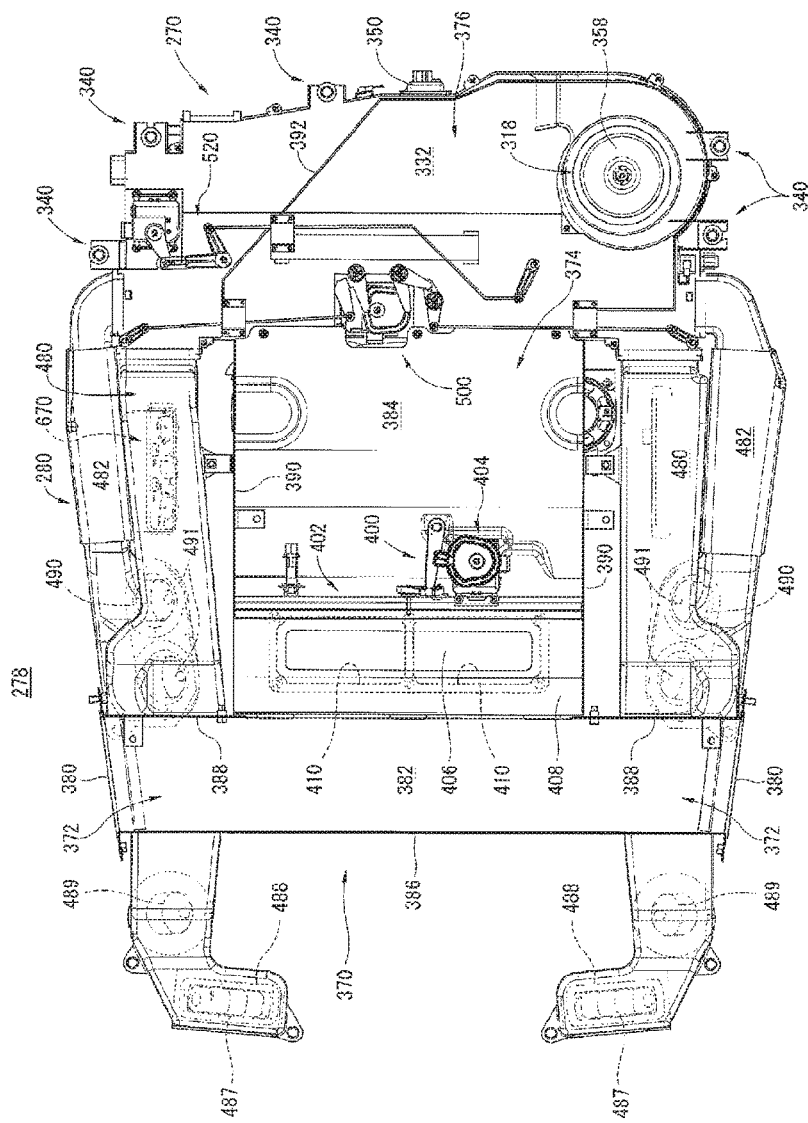
FIG. 10 A plan view of the ceiling main body.
Figure 11:
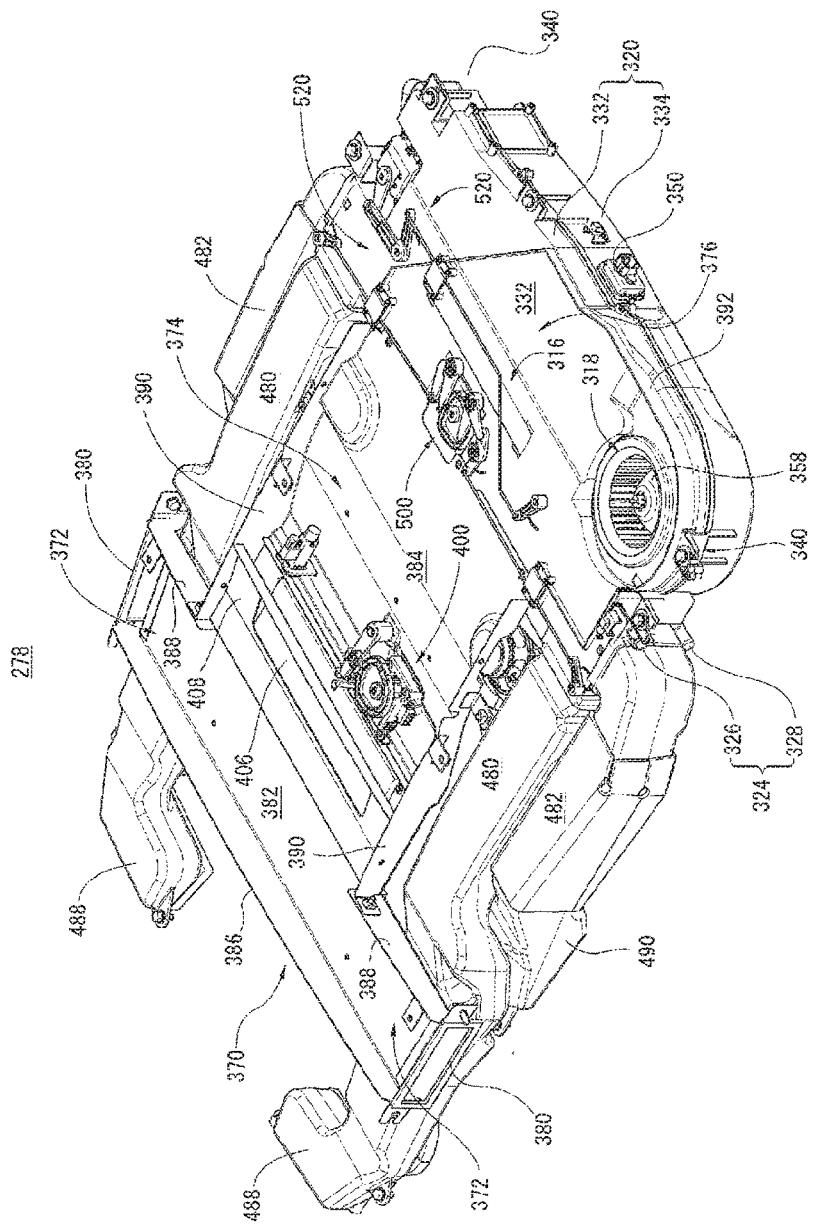
FIG. 11 A perspective view of the ceiling main body.

The following describes a structure of the ceiling part 250, with reference to FIG. 5, FIG. 8, and FIG. 9. Namely, as hereinabove described, the ceiling part 250 includes, in the ceiling plane portion framed by the pair of left and right upper beam pieces 208, the front beam piece 216, the upper rear beam piece 218, and the main body support member 222: a ceiling main body 278; a plate-like inner ceiling piece 272 forming an inner wall of the ceiling main body 278; a plate-like outer ceiling piece 274 disposed facing directly above the inner ceiling piece 272 to form an outer wall of the ceiling main body 278; and a rear ceiling piece 276 interposed between the rear end edge portions of the inner and outer ceiling pieces 272 and 274 to form the lower and rear walls of the air conditioner main body arrangement part 270.

The ceiling main body 278 is formed by duct arrangement portions 280 and the air conditioner main body arrangement part 270. In each of the duct arrangement portions 280, a later-described air supply duct 370 and an air feeding duct are disposed. The inner ceiling piece 272 has its front end edge portion attached to the lower end surface portion of the front beam piece 216 while having its rear end edge portion attached to the lower end surface portion of the upper rear beam piece 218. The outer ceiling piece 274 has its front end edge portion attached to the upper end surface portion of the front beam piece 216 and is formed in a stream-line shape in a side view. At the rear portion of the outer ceiling piece 274, a rear extended portion 290 extended to protrude rearward from the upper rear beam piece 218 is formed.

The outer ceiling piece 274 covers the ceiling main body 278 from above. As shown in FIG. 8, between the under surface of the outer ceiling piece 274 and the top surface of each piece surrounding the ceiling main body 278 in a frame shape, a seal member 282 formed in a frame shape in a plan view is interposed, so as to ensure a favorable sealing property of the ceiling part 250. In other words, rainwater, washing water, and the like are prevented from entering the ceiling part 250.

More specifically, the seal member 282 is formed in a frame shape by: a front edge portion 284 extended in the left-right direction along the top surface of the upper rear edge portion of the front beam piece 216; the left and right side edge portions 286 extended in the front-rear direction along the top surface of the inner upper edge portion of the pair of left and right upper beam pieces 208; and a rear edge portion 288 extended in the left-right direction along the top surface of the forward-extending surface portion 228 of the main body support member 222.

The rear ceiling piece 276 is formed by attaching the front end edge portion 294 to the rear end surface portion of the upper rear beam piece 218 so as to extend rearward and rise upward, and by bending the upper end edge portion 296 forward. In the front end edge portion 294, there is formed a discharge hole (not shown) for discharging to outside the machine, rainwater, washing water, and the like entering a later-described multipurpose space 348 from a gap 298. The upper end edge portion 296 of the rear ceiling piece 276 is overlapped with the top surface of the rear end edge portion 292 of the rear extended portion 290, and attached by a bolt 229 and a nut 231 to the bracket 227 provided in the upper portion of the rising surface portion 226. With the rear extended portion 290 and the rear ceiling piece 276, the air conditioner main body arrangement part 270 is formed in a shape protruding rearward. Inside the air conditioner main body arrangement part 270, an air conditioner main body 310 constituting a part of an air conditioner device 300 is arranged.

The air conditioner device 300 includes a cooling cycle mechanism and a heating cycle mechanism. That is, the air conditioner device 300 includes: the air conditioner main body 310 arranged inside the air conditioner main body arrangement part 270; the air conditioner condenser 49, the air conditioner compressor 59, and the receiver dryer 51 arranged in the later-described motor unit 11; and refrigerant pipes 322, and the like which provide fluid-flowable connections among these components.

The air conditioner main body 310 includes: an evaporator 312 configured to generate cool air; an expansion valve 314 (see FIG. 15) including an expansion valve and a throttle, which adjusts the pressure inside the evaporator 312; a heater core 316 configured to generate warm air; a blower fan 318 configured to feed cooled air or warmed air generated by these members; and a main body casing 320 for accommodating them.

The cooling cycle mechanism includes: the compressor 59 configured to compress a refrigerant; a condenser 49 configured to cool to liquefy the compressed high pressure refrigerant; the receiver dryer 51 accommodating therein a strainer for removing impurities in the refrigerant and a drying agent for removing water, which serves as a tank for temporarily storing the refrigerant liquefied by the condenser 49; the expansion valve 314 attached to an inlet port of the evaporator 312, which vaporizes a high-temperature high-pressure liquefied refrigerant passing therethrough into mist and sprays the mist; the evaporator 312 which is cooled by letting the vaporized refrigerant passes therethrough while taking away the heat; and refrigerant pipes 322 which connect these members in a fluid-flowable manner, to form a circulation passage for circulating a refrigerant in the liquid state or the gas state.

Figure 15:
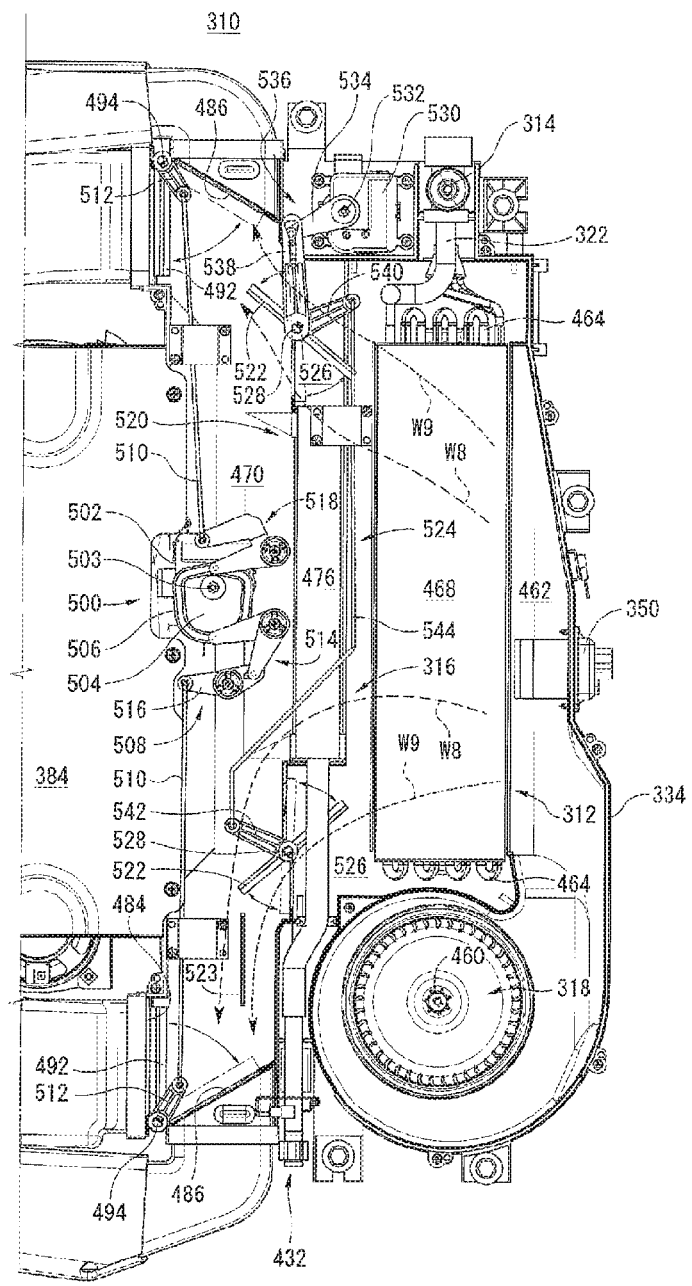
FIG. 15 An explanatory diagram providing an enlarged plan view indicating the inside of the air conditioner main body.
Figure 16:
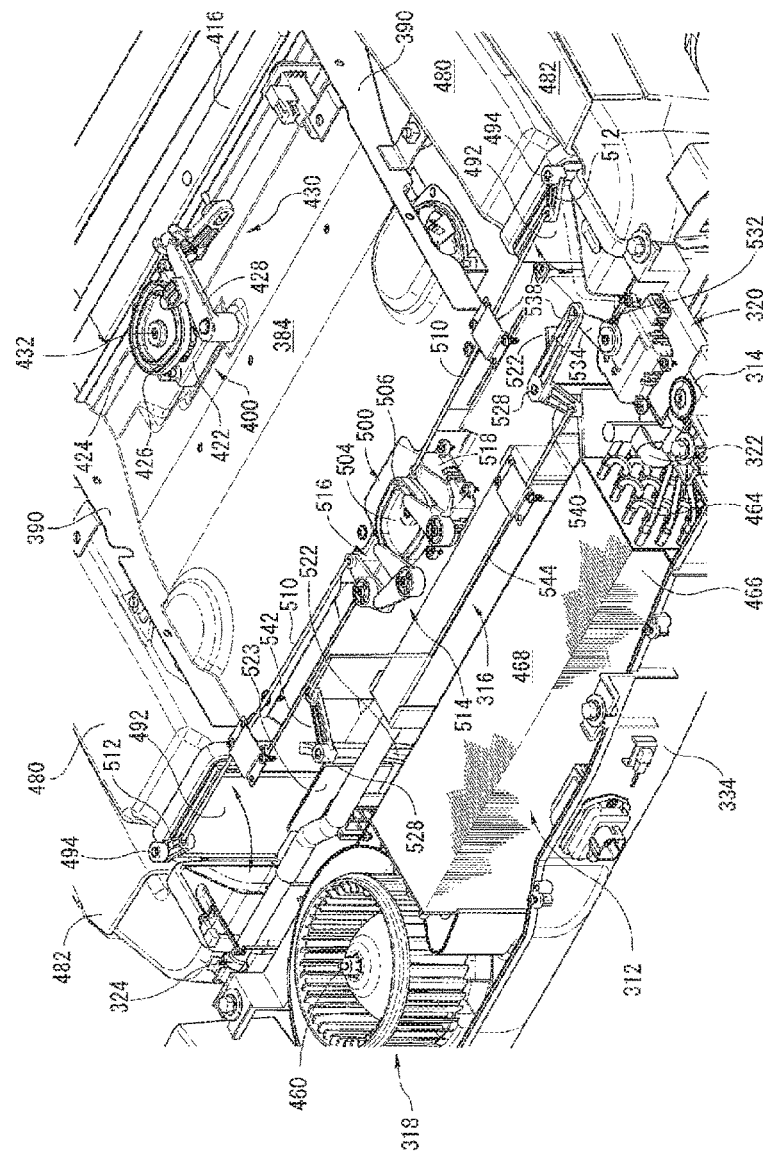
FIG. 16 An explanatory diagram providing an enlarged perspective view indicating the inside of the air conditioner main body.
Figure 22:
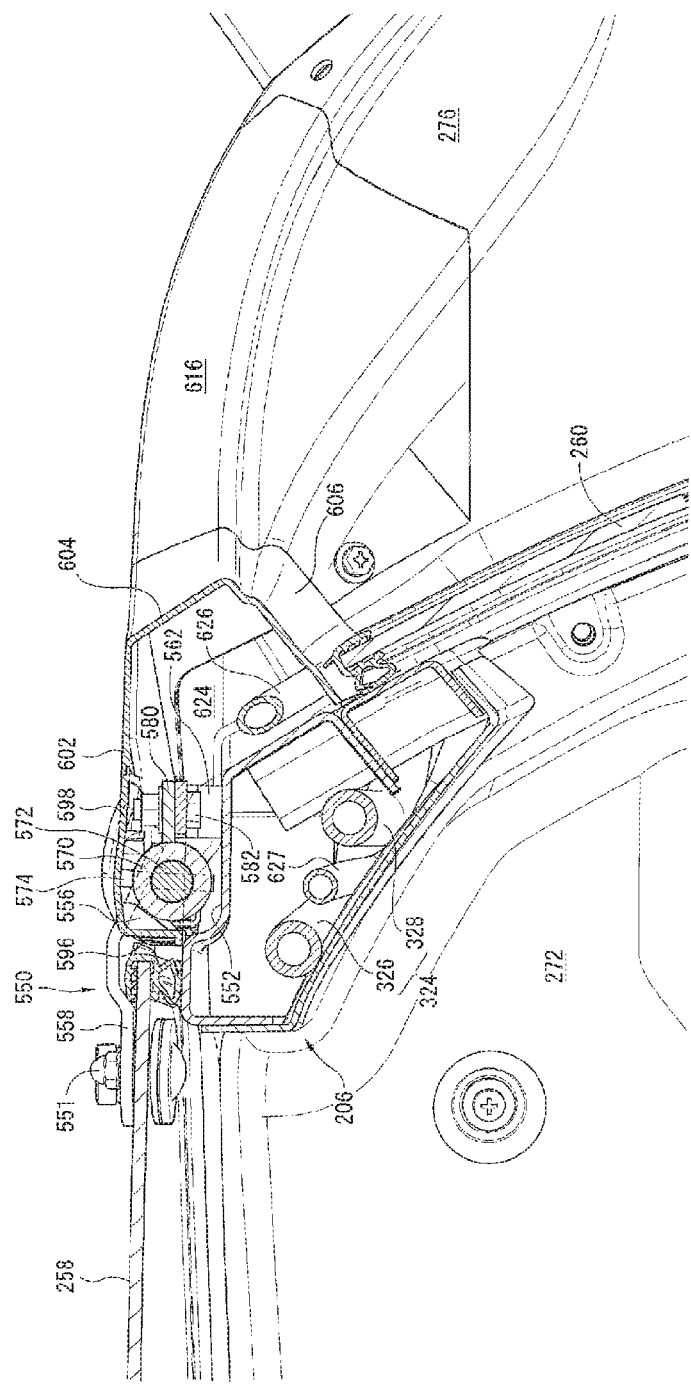
FIG. 22 A cross-sectional view taken along the line I-I of FIG. 19.
Figure 23:
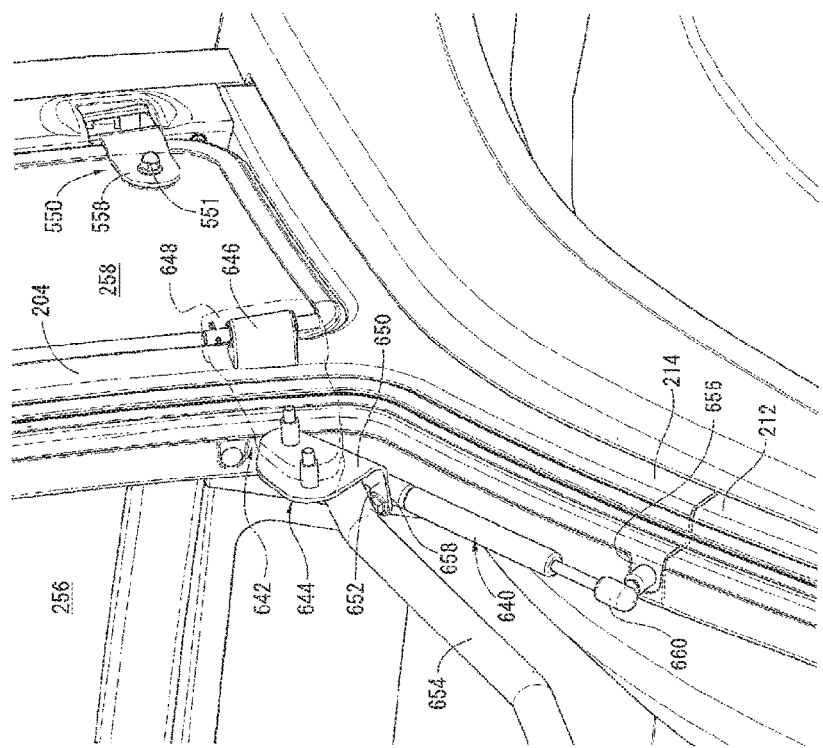
FIG. 23 An explanatory diagram showing a state where open/close support means is attached.

The heating cycle mechanism includes: a water pump (not shown) interlockingly connected to the later-described engine 40; a heater core 316 provided inside the air conditioner main body 310, which functions as a heat exchanger; warm water pipes 324 connecting these in an interlocking manner. The warm water pipes 324 include an ejection side warm water pipe 326 and a returning side warm water pipe 328, as shown in FIG. 15 and FIG. 22.

Next, the following describes characteristic structures of the tractor A in an order of: a support structure for the air conditioner main body 310 arranged in the ceiling part 250, a structure of taking in the outside air into the air conditioner main body 310, a structure of blowing out cooled/warmed air from the air conditioner main body 310, and an open/close pivot structure of the side window parts 258.

[Support Structure of Air Conditioner Main Body]
The following describes, with reference to FIG. 5 to FIG. 8, the support structure for the air conditioner main body 310. The air conditioner main body arrangement part 270 for arranging therein the air conditioner main body 310 is provided to the ceiling part 250 of the cabin C which covers the driver unit 20, in such a manner as to protrude rearward of the pair of left and right rear strut pieces 206 forming a part of the cabin frame 200. The air conditioner main body arrangement part 270 stretches over the upper rear beam piece 218 laterally bridged between upper end portions of the pair of left and right rear strut pieces 206 so that the main body support member 222 protrudes rearward. The main body support member 222 forms a part of the cabin frame 200, and has supporting rigidity to support the air conditioner main body 310 from below. Further, the main body support member 222 enables attachment of the air conditioner main body 310 from above.

The main body support member 222 includes: the horizontal protruding surface portion 224 which is integrally formed by rigid thin sheet metal in such a manner as to horizontally protrude; and a rising surface portion 226 which rises upward from the rear end edge portion of the horizontal protruding surface portion 224. The rising surface portion 226 has a plurality of horizontally and inwardly protruding attachment stays 330 (four, in the present embodiment) which are provided in such a manner that each attachment stay 330 has its top surface positioned on a single imaginary horizontal plane, thereby enabling attachment of the air conditioner main body 310 from above, via the attachment stays 330, in a bridging manner.

The air conditioner main body 310 is structured by arranging, in the main body casing 320, devices and the like for generating cooled air and warmed air. Left and right side walls and a rear wall, which are side walls of the main body casing 320, are provided with a plurality of attachment pieces 340 (five, in the present embodiment) which face the attachment stays 330 and protrude outward. Each attachment piece 340 and each attachment stay 330 are overlapped with each other in the up-down direction and screwed by an attachment bolt 346 penetrating the overlapping portion in the up-down direction, thereby enabling attachment of the air conditioner main body 310 from above in a bridging manner, to the attachment stay 330 via the attachment pieces 340. A space is formed between the main body support member 222 and the main body casing 320 attached, in a bridging manner, to the main body support member 222 via the attachment stays 330 and the attachment pieces 340.

More specifically, the rising surface portion 226 of the main body support member 222 is curved to form a rearwardly inflated shape in a plan view. In the rising surface portion 226, a first attachment stay 330 is provided on the left side end portion so as to horizontally protrude towards the right side; a second attachment stay 330 is provided on the left side portion so as to horizontally protrude towards the right front side; and third and fourth attachment stays 330 are provided on the right side portion so as to horizontally protrude forward. Further, a fifth attachment stay 330 is provided on the inside of the rear end portion of the right side upper beam piece 208 so as to horizontally protrude towards the right side.

The main body casing 320 of the air conditioner main body 310 is formed by connecting in a fitting manner a lower end edge portion of a box-shaped upper case forming piece 332 whose under surface is opened, with an upper end edge portion of a box-shaped lower case forming piece 334 whose top surface is opened. The upper case forming piece 332 has horizontally protruding upper part pieces 336 in positions of its ceiling surface corresponding to the first to fifth attachment stays 330. On the other hand, the lower case forming piece 334 has horizontally protruding lower part pieces 338 which match to make surface contact with the upper part pieces 336 in the up-down direction. The upper part pieces 336 and the lower part pieces 338 in surface contact form the attachment pieces 340.

Each attachment piece 340 has a bolt insertion hole 342 which opens in the up-down direction. Each attachment stay 330 has a bolt screw portion 344. The bolt insertion hole 342 of each attachment piece 340 is matched from above with the bolt screw portion 344 of the corresponding attachment stay 330, and the attachment bolt 346 is screwed into the bolt insertion hole 342 and the bolt screw portion 344 matched with each other. This way, the main body casing 320, i.e., the air conditioner main body 310, is attached in a bridging manner to the main body support member 222.

The air conditioner main body 310 is attached to the main body support member 222, in a separated state. Between the air conditioner main body 310 and the main body support member 222, a multipurpose space 348 is formed. The multipurpose space 348 is functions as: a space for discharging rainwater, washing water, and the like; a space for taking in the outside air and guiding the outside air taken-in into an outside air introduction port 354; a space for piping, and the like. The reference numeral 350 is a temperature sensor attached in a penetrating manner to the rear wall of the main body casing 320. The temperature sensor 350 detects the temperature of cooled air generated by the evaporator 312.

The support structure for the air conditioner main body 310 as described above enables attachment of the air conditioner main body 310 from above to the main body support member 222 having supporting rigidity for supporting the air conditioner main body 310 from below. Therefore, the air conditioner main body 310 can be easily attached to the main body support member 222.

Further, the rising surface portion 226 of the main body support member 222 has the plurality of horizontally and inwardly protruding attachment stays 330. Therefore, the air conditioner main body 310 can be attached from above in a bridging manner via the plurality of attachment stays 330. Thus, the work of attaching the air conditioner main body 310 to the main body support member 222 can be easily and reliably performed from above in a stable manner.

Further, the side walls of the main body casing 320 of the air conditioner main body 310 has the plurality of (five in the present embodiment) outwardly protruding attachment pieces 340 facing the attachment stays 330. Each attachment piece 340 and each attachment stay 330 are overlapped with each other in the up-down direction and screwed by an attachment bolt 346 penetrating the overlapping portion in the up-down direction, thereby enabling attachment of the air conditioner main body 310 from above in a bridging manner, to the attachment stay 330 via the attachment pieces 340. Thus, the work of attachment from placing the air conditioner main body 310 on the main body support member 222 until fastening the bolt can be efficiently performed from above which is largely opened.

Further, when the air conditioner main body 310 is attached to the main body support member 222, the multipurpose space 348 is formed between the main body support member 222 and the air conditioner main body 310. Therefore, rainwater, washing water, and the like can be discharged outside the machine through the multipurpose space 348. In other words, the rainwater, washing water and the like can be prevented from being caught in the air conditioner main body 310 and retained on the main body support member 222. Further, the multipurpose space 348 enables compact piping and wiring therethrough.

[Structure of Taking in Outside Air into Air Conditioner Main Body]

The following describes, with reference to FIG. 5 to FIG. 13, the structure of taking in the outside air into the air conditioner main body 310. The ceiling part 250 formed in the form of a hollow flat plate is bridged between the pair of left and right upper beam pieces 208 forming the left and right side upper portions of the cabin C. The ceiling part 250 forms the ceiling main body 278, along with the duct arrangement portions 280 and the air conditioner main body arrangement part 270. While the air supply duct 370 and the air feeding duct are arranged in the duct arrangement portions 280, the air conditioner main body 310 is arranged in the air conditioner main body arrangement part 270, so as to enable supply of the outside air to the air conditioner main body 310 via the air supply duct 370.

Figure 12:
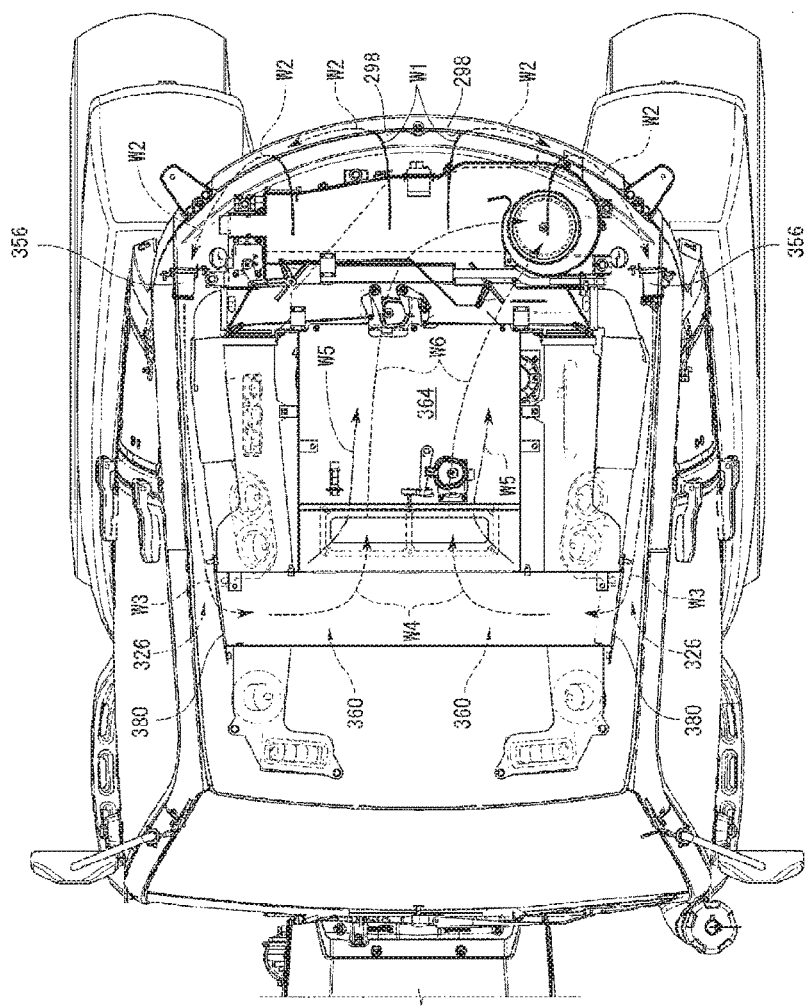
FIG. 12 An explanatory diagram showing an air supply to a blower fan.
Figure 13:
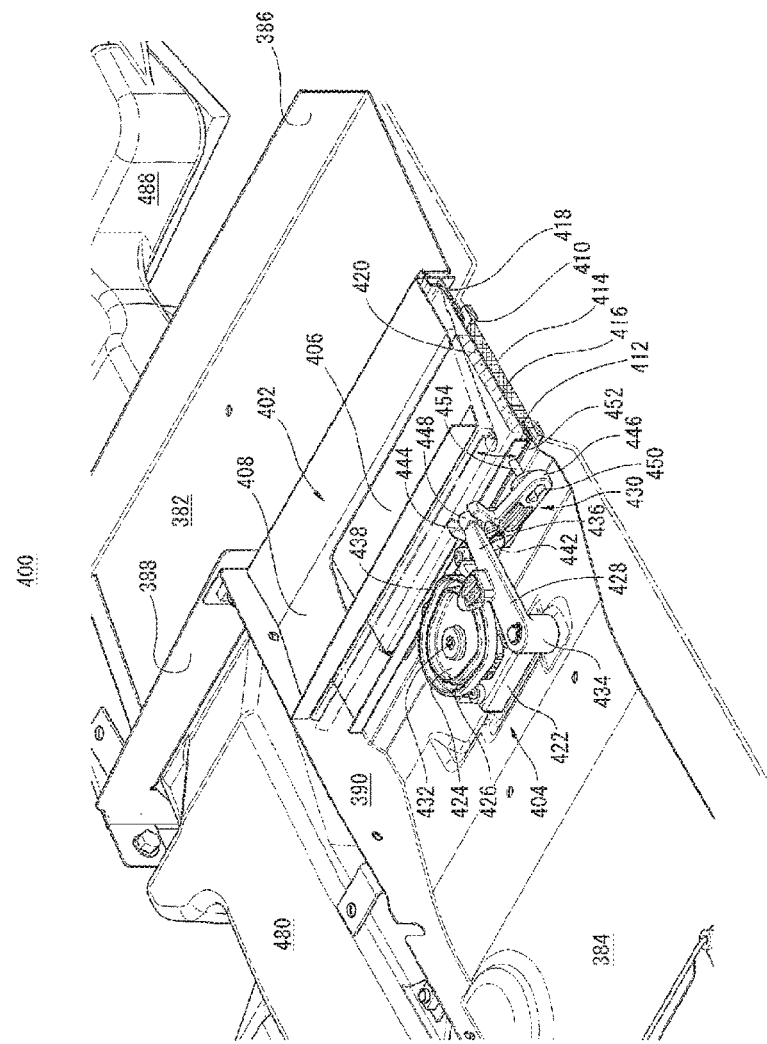
FIG. 13 An explanatory diagram providing a perspective view of a switch drive part.
Figure 21:
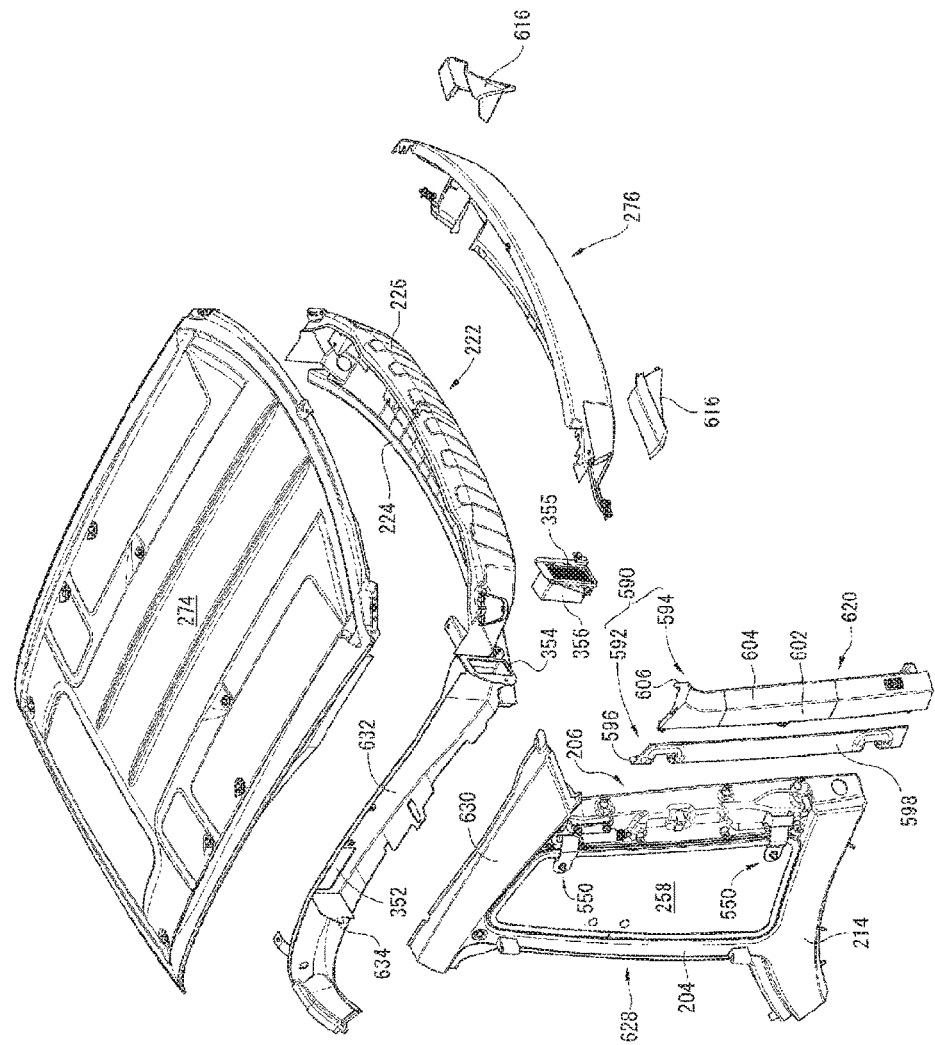
FIG. 21 An exploded explanatory diagram of a left side rear portion of the cabin.

The upper beam pieces 208 are each formed in a cylindrical shape extended in the front-rear direction. In the front portion of each of the upper beam pieces 208, a communication port 352 communicating with the air supply duct 370 of the ceiling part 250 is formed. The rear end portion of the upper beam piece 208 is formed in a trumpet-like shape whose diameter gradually expands towards the rear, and a rear end opening serves as the outside air introduction port 354, as shown in FIG. 12 and FIG. 21. In the outside air introduction port 354, there is arranged a cylindrical filter case 356 in which an outside air filter 355 is provided. The dusts and the like in the outside air taken in through the outside air introduction port 354 are removed by the outside air filter 355. The outside air introduced through the outside air introduction port 354 is supplied to the air conditioner main body 310, via the upper beam piece 208, the communication port 352, and the air supply duct 370 in the ceiling part 250.

The ceiling part 250 is formed by the inner ceiling piece 272, the outer ceiling piece 274, and the rear ceiling piece 276 interposed between rear end edge portions of both the inner and outer ceiling pieces 272 and 274, and covers the rear end portions of the pair of left and right upper beam pieces 208 with beam piece cover members 616, and covers the main body support member 222 with the rear ceiling piece 276. The upper end edge portion 296 of the rear ceiling piece 276 is overlapped with the rear end edge portion 292 formed in a form of stepped depression, on the rear extended portion 290 of the outer ceiling piece 274, in such a manner as to enable taking-in of the outside air W1 via a gap 298 formed in the overlapped portion, as shown in FIG. 12. Via-gap-taken-in outside air W2 taken in via the gap 298 is introduced via the multipurpose space 348 formed between the main body support member 222 and the rear ceiling piece 276 and the beam piece cover members 616, and via the outside air filter 355 of the outside air introduction port 354 opened in the rear end portion of each of the upper beam pieces 208.

In the rear portion of the ceiling part 250, the air conditioner main body 310 is arranged. Between the outside air introduction port 354 and an inlet port 358 of the blower fan 318 provided in the air conditioner main body 310, a pair of left and right outside air supply passages 360 are interposed. Each outside air supply passage 360 includes an outside air introduction passage 362 formed in the upper beam piece 208 and an air supply passage 364 formed in the air supply duct 370, and is bent in a folding manner. In other words, the outside air supply passages 360 is formed in an inverted U-shape in a long detouring manner. Specifically, introduced outside air W3 introduced from the outside air introduction port 354 is introduced to the communication port 352 via the outside air introduction passage 362 in the upper beam piece 208. Then, the supplied outside air W4 supplied via the communication port 352 is supplied to the inlet port 358 of the blower fan 318 of the air conditioner main body 310, which is in the rear portion of the ceiling part 250, via the air supply passage 364 in the air supply duct 370.

In the rear portion of the ceiling part 250, there are provided the air conditioner main body 310, and the air supply duct 370 configured to supply air to the air conditioner main body 310. The air supply duct 370 includes: a pair of left and right branch intake portions 372 formed on the pair of left and right upper beam pieces 208, respectively, which portions take in the introduced outside air W3 introduced through the communication port 352; a rearward conveying portion 374 which joins the supplied outside air W4 taken in via the branch intake portion 372 and conveying the joined air rearward; and a collection/supply portion 376 which collects and supplies the air (the supplied outside air W4 or the supply internal air W6) conveyed via the rearward conveying portion 374 to the inlet port 358 of the blower fan 318 provided in the air conditioner main body 310.

The air supply duct 370 of the present embodiment forms the air supply passage 364 in the air supply duct 370, by forming each of the pair of left and right branch intake portions 372 in a linear duct shape extended in the left-right direction, forming the rearward conveying portion 374 in a linear duct shape extended rearward from the joining portion of the pair of left and right branch intake portion 372, and forming the collection/supply portion 376 in a funnel shape so that the air is collected to the inlet port 358 of the blower fan 318. The pair of left and right branch intake portions 372 and the rearward conveying portion 374 form a T-shape in plan view. Further, in each of the pair of left and right upper beam pieces 208 formed in a cylindrical shape extended in the front-rear direction, the outside air introduction passage 362 is formed, the outside air introduction passages 362 on both sides are communicated with each other via the air supply passage 364 to form the pair of left and right outside air supply passages 360, and make the outside air supply passages 360 long.

More specifically, in the front portion of each of the pair of left and right upper beam pieces 208, there is provided a quadrangular communication port 352 (see FIG. 21) long in the front-rear direction. To this communication port 352, there is provided a frame member 380 having a quadrangular frame shape which matches the periphery of the communication port 352. The air supply duct 370 includes: a branch take-in bottom piece 382; a rear conveying bottom piece 384; a top surface portion of the upper case forming piece 332 of the main body casing 320; a front end duct forming piece 386; a pair of left and right intermediate duct forming pieces 388; a pair of left and right side duct forming pieces 390; a rear duct forming piece 392; and the outer ceiling piece 274.

The branch take-in bottom piece 382 forms a bottom surface portion of the branch intake portions 372. The rear conveying bottom piece 384 forms the bottom surface portion of the rearward conveying portion 374. The front end duct forming piece 386 linearly extend in the left-right direction along the front end edge portion of the branch take-in bottom piece 382, and is interposed between the front end edge portions of the pair of left and right frame members 380. The intermediate duct forming pieces 388 extend linearly inward from the rear end edge portions of the pair of left and right frame members 380 along the rear end edge portion of the branch take-in bottom piece 382. The pair of side duct forming pieces 390 extend linearly towards the air conditioner main body 310 at the rear, from the inner end portions of the intermediate duct forming pieces 388, along a pair of left and right side edge portions of the rearward conveying portion 374. The rear duct forming piece 392 connects the left and right side end portions between the rear end portions of the both side duct forming pieces 390, and the midway portion of the top surface portion of the main body casing 320 is formed to protrude to a position immediately rearward of the inlet port 358 of the blower fan 318.

The outside air supply passages 360 forms an elongated flow passage in an inverted U-shape in a plan view, along with the outside air introduction passage 362 formed in the pair of left and right upper beam pieces 208 each formed in a cylindrical-shape extending in the front-rear direction, and the air supply passage 364 formed in the air supply duct 370. The dust and the like in the introduced outside air is mostly removed by the outside air filter 355 provided in the outside air introduction port 354. Slightly remaining dust and the like introduced are settled (dropped) in the outside air supply passages 360 while the outside air is flowing through the long outside air supply passages 360. Therefore, air is supplied to the inlet port 358 of the blower fan 318 with dust and the like scarcely contained.

In a midway portion of the rearward conveying portion 374, there is provided passage switching means 400 configured to switch between the outside air circulation passage and an internal air circulation passage. That is, the outside air circulation passage supplies the outside air to the inlet port 358 of the blower fan 318 in the air conditioner main body 310, and supplies warmed air and or cooled air generated in the air conditioner main body 310 to the driver unit 20 in the cabin C, and then exhausts the air outside the machine, thereby circulating the outside air through the inside of the cabin C. The internal air circulation passage supplies the internal air W5 of the driver unit 20 in the cabin C to the inlet port 358 of the blower fan 318 in the air conditioner main body 310, and supplies the warmed air and/or cooled air generated in the air conditioner main body 310 to the driver unit 20 in the cabin C, thereby circulating the internal air W5 between the air conditioner device 300 and the driver unit 20.

The passage switching means 400 includes: a passage switching unit 402 arranged on the upstream of the rearward conveying portion 374, which is configured to perform switching between internal/outside air circulation passages; a switch drive part 404 arranged on the downstream of the passage switching unit 402 in the rearward conveying portion 374, which drives switching by the passage switching unit 402.

In the passage switching unit 402, an inlet forming piece 408 having an outside air inlet port 406 is arranged such a manner as to be inclined (inclined rearward) to have the lower-front side and the higher rear side, in the front portion of the rearward conveying portion 374 formed in a duct shape. In portions of the inner ceiling piece 272 and the rear conveying bottom piece 384 immediately below the outside air inlet port 406, there are formed a first internal air inlet port 410 and a second internal air inlet port 412, respectively. The outside air inlet port 406 and the second internal air inlet port 412 has substantially the same quadrangular shape which is long in the left and right direction. On the other hand, the first internal air inlet port 410 has two quadrangular shapes each of which is long in the left and right direction are arranged side-by-side on the left and right. In the first internal air inlet port 410, an internal air filter 414 is provided.

Between the inlet forming piece 408 and the rear conveying bottom piece 384, a passage switching piece 416 is arranged. The passage switching piece 416 is formed as a quadrangular plate, and has its front end edge portion 418 attached to the rear conveying bottom piece 384, so that its rear end edge portion side is able to swing in the up-down direction about the front end edge portion 418. On the top surface of the passage switching piece 416, a closing pad 420 configured to close the outside air inlet port 406 is provided.

When the passage switching piece 416 is swung upward to assume a rearward inclined posture, the outside air inlet port 406 is closed from below by the closing pad 420. When the passage switching piece 416 is swung downward to assume a horizontally lying posture, the first and the second internal air inlet ports 410 and 412 are closed from above. That is, when the outside air inlet port 406 is closed by the passage switching piece 416, the first and the second internal air inlet ports 410 and 412 are opened, thereby forming the internal air circulation passage by which the internal air in the cabin C is supplied to the inlet port 358 of the blower fan 318 via the first and the second internal air inlet ports 410 and 412. Further, when the first and the second internal air inlet ports 410 and 412 are closed by the passage switching piece 416, the outside air inlet port 406 is opened, thereby forming the outside air circulation passage by which the outside air introduced via the outside air introduction passage 362 is supplied to the inlet port 358 of the blower fan 318 via the outside air inlet port 406.

The switch drive part 404 includes: a cam driving motor 422 placed on the rear conveying bottom piece 384; a cam piece 424 having a deformed disc shape which is rotated by the cam driving motor 422; a left/right swing arm 428 connected via a cam groove 426 formed at the peripheral edge portion of the cam piece 424; and an interlocked arm 430 which swings the passage switching piece 416 in the up-down direction, in response to the left/right swing operation of the left/right swing arm 428.

The cam driving motor 422 has a drive shaft 432 protruding upward. To the upper end portion of the drive shaft 432, the cam piece 424 of the deformed disc shape is eccentrically attached, so that the cam piece 424 is horizontally rotated. On the top surface of the cam piece 424 having the deformed disc shape, the cam groove 426 which is endless in plan view and which is opened upward is formed along the peripheral edge portion.

The left/right swing arm 428 is positioned rearward on the right side of the cam driving motor 422 on the rear conveying bottom piece 384, and its arm base end portion 434 is pivotally supported so as to be swingable about a shaft in the up-down direction. The arm leading end portion 436 extends forward on the right side of the cam piece 424. In the midway portion of the left/right swing arm 428, an interlocking piece 438 is provided so as to project to a position immediately above the cam groove 426, and in the cam groove 426, a slide piece (not shown) hanging from the leading end of the interlocking piece 438 is slidably fitted.

When the cam piece 424 is driven and rotated, the slide piece slides in the cam groove 426, and the left/right swing arm 428 linked via the interlocking piece 438 swings in the left/right directions within a constant width about the arm base end portion 434.

The interlocked arm 430 includes: a pivotally-supporting portion 442 pivotally supported about a shaft in the front-rear direction at a stepped protrusion of the rear conveying bottom piece 384; an arm engagement piece 444 formed to protrude upward from the pivotally-supporting portion 442; and a connecting piece 446 formed to protrude towards the right side from the pivotally-supporting portion 442. The arm engagement piece 444 is formed in a U-shape in a rear view, and a spherical fitting piece 448 formed on the arm leading end portion 436 of the left/right swing arm 428 is rotatably and slidably fitted in the arm engagement piece 444 to engage therewith. At the leading end of the connecting piece 446, an elongated hole 450 which is long in the left-right direction is formed. In the elongated hole 450, an interlocking pin 454 protruding rearward from a midway portion of a rising piece 452 formed in the rear end edge portion of the passage switching piece 416 is inserted.

When the leading end of the left/right swing arm 428 is swung in the left-right direction, the arm engagement piece 444 engaged with the leading end of the left/right swing arm 428 is also swung in the left-right direction about the pivotally-supporting portion 442. This also swings the connecting piece 446 about the pivotally-supporting portion 442 in the up-down direction, thus swinging the passage switching piece 416 in the up-down direction via the interlocking pin 454. As described, the passage switching piece 416 reliably performs switching operation between the outside air circulation passage and the internal air circulation passage, by the switch drive part 404 having a compact structure.

Figure 14:
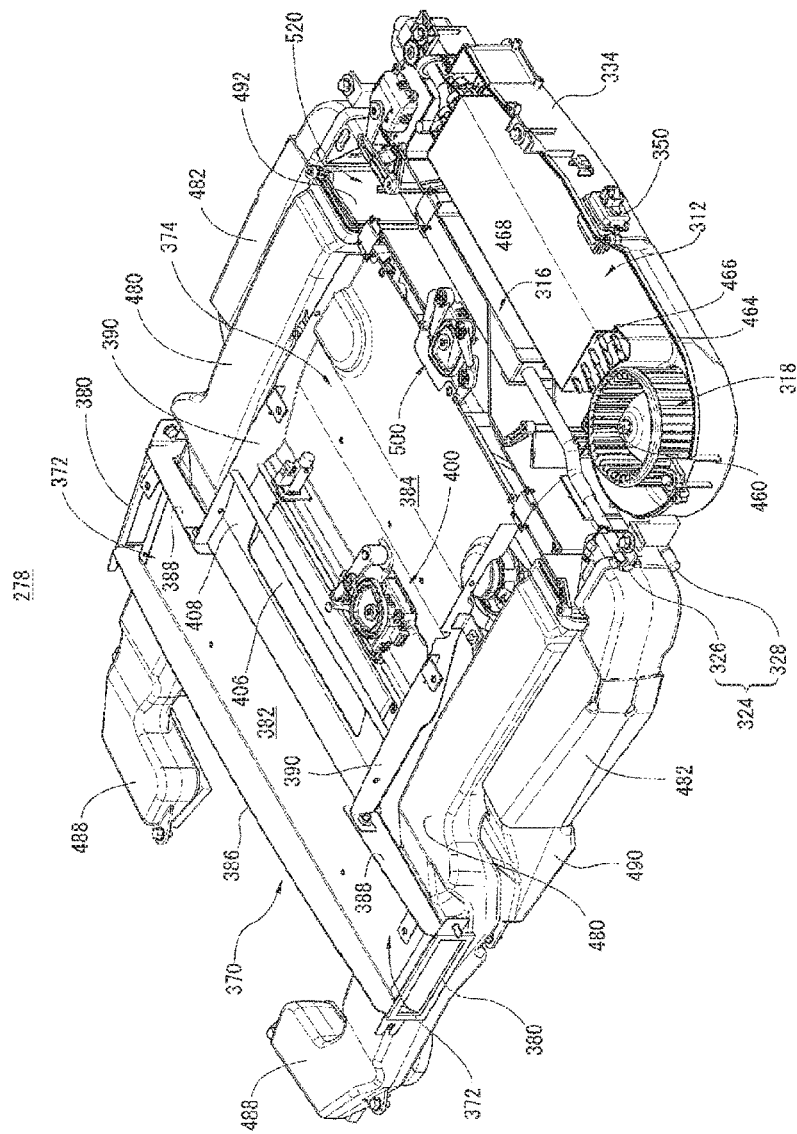
FIG. 14 A perspective view of the ceiling main body indicating the inside of the air conditioner main body.

The main body casing 320 of the air conditioner main body 310 has a shape which is long in the left-right direction. As shown in FIG. 14 and FIG. 15, in the main body casing 320, the blower fan 318 is arranged on the left side portion, and the evaporator 312 is arranged on the right side of the blower fan 318. The heater core 316 is arranged immediately forward of the evaporator 312.

The blower fan 318 is a sirocco fan. The inlet port 358 is opened in the left side portion of the top surface of the main body casing 320 which is positioned in the axial direction of the fan shaft 460 (the up-down direction in the present embodiment). An air-blow path 462 which is long in the left-right direction is formed along the left side wall of the main body casing 320 and the rear wall of the main body casing 320 which cover the outer circumference of the fan shaft 460. The blower fan 318, when being driven to rotate about the fan shaft 460, takes in the supplied outside air W4 or the supplied internal air W6 from the inlet port 358, and blows air to the air-blow path 462. The blown air pressure-fed is guided forward along the air-blow path 462.

The evaporator 312 is arranged immediately forward of the air-blow path 462. That is, the evaporator 312 is on the upstream of a blown-air passage 470 in which blown air is pressure-fed. As also shown in FIG. 6 and FIG. 7, the evaporator 312 has a meandering evaporator forming pipe 464 which is long in the left-right direction. To the evaporator forming pipe 464, multiple cooling heat exchanger plates 466 are attached, spaced from one another relative to the left-right direction, thereby forming a cooling heat exchanger plate set 468. Heat exchanging takes place when the blown air from the blower fan 318 passes the cooling heat exchanger plates 466, thereby turning the blown air fed into cooled air. The evaporator forming pipe 464 is connected to a refrigerant pipe 322.

The heater core 316 is arranged immediately forward of the evaporator 312. That is, the heater core 316 is on the downstream of the blown-air passage 470 in which blown air is pressure-fed. The heater core 316 has a meandering heater-core forming pipe (not shown) which is long in the left-right direction (but slightly shorter than the evaporator 312). To the heater-core forming pipe (not shown), multiple heating heat exchanger plates (not shown) are attached, spaced from one another relative to the left-right direction, thereby forming a heating heat exchanger plate set 476. Heat exchanging takes place when the blown air from the blower fan 318 passes the heating heat exchanger plates, thereby turning the blown air fed into warmed air. The heater-core forming pipe is connected to the warm water pipe 324. The warm water pipes 324 include an ejection side warm water pipe 326 and a returning side warm water pipe 328.

Here, the temperature of cool air can be maintained at the lowest temperature, by stopping supply of hot water to the heater core 316 so as to stop generation of warmed air, while the evaporator 312 generates cooled air. To the contrary, the temperature of warm air can be maintained at the highest temperature, by supplying hot water to the heater core 316 to generate warmed air, while stopping generation of cooled air by the evaporator 312. Further, the temperature of cooled air or warmed air can be adjusted as needed, by adjusting generation of both cooled air by the evaporator 312 and warmed air by the heater core 316.

In the present embodiment, blown air generated by the blower fan 318 blows the cooled air generated by the evaporator 312 disposed on the upstream side of the blown-air passage, to the heater core 316 arranged on the downstream side of the blown-air passage, thereby appropriately reducing the temperature of the warmed air generated by the heater core 316.

With the above structure of taking in the outside air into the air conditioner main body 310, the outside air introduced via the outside air introduction port 354 is supplied from the communication port 352 into the air conditioner main body 310 in the ceiling part 250, via the outside air introduction passage 362 formed in the upper beam pieces 208. Therefore, the outside air supply passages 360 through which the outside air is supplied from the outside air introduction port 354 to the air conditioner main body 310 is made long by the outside air introduction passage 362. The dust contained in the outside air falls in the outside air introduction passage 362, and does not flow into the air conditioner main body 310. As the result, it is possible to prevent a problem of dust in the outside air causing clogs in the blower fan (sirocco fan) 318 provided in the air conditioner main body 310 which deteriorates the air blowing function.

The outside air supply passages 360 interposed between the outside air introduction port 354 and the air conditioner main body 310 is bent in a detouring manner, by the outside air introduction passage 362 formed in the upper beam pieces 208 and the air supply passage 364 formed in the ceiling part 250. Therefore, the outside air introduced via the outside air introduction port 354 is introduced to the communication port 352 via the outside air introduction passage 362, and then supplied from the communication port 352 to the air conditioner main body 310 arranged in the rear portion via the air supply passage 364. This enables formation of a further longer outside air supply passages 360. Therefore, the above mentioned action and effect brought about by making a long outside air supply passages 360 can be further ensured.

In the air supply duct 370, there is formed the air supply passage 364 communicating with the outside air introduction passage 362 in each of the pair of left and right cylindrical upper beam pieces 208, and the pair of left and right outside air supply passages 360 are formed by the pair of left and right outside air introduction passages 362 and the air supply passage 364. Therefore, the pair of left and right outside air supply passages 360 can be formed compact, while ensuring the amount of outside air taken in via the pair of left and right outside air supply passages 360.

The upper end edge portion 296 of the rear ceiling piece 276, which covers the rear end portions of the pair of left and right upper beam pieces 208 and the main body support member 222, is overlapped with the rear end edge portion 292 on the rear extended portion 290 of the outer ceiling piece 274, in such a manner as to enable taking-in of the outside air via the gap 298 formed in the overlapped portion. The outside air W1 taken in is introduced, via the multipurpose space 348 formed between the main body support member 222 and the rear ceiling piece 276, to the outside air introduction port 354 opened in the rear end portion of each of the upper beam pieces 208. Therefore, even if rain water, high-pressure cleaning water, and the like enter the gap 298, the rain water, the high-pressure cleaning water, and the like will be discharged outside the machine via a discharge hole formed in the front end edge portion 294 of the rear ceiling piece 276 which is the terminal end portion side of the multipurpose space 348, and will not enter the outside air supply passages 360 from the outside air introduction port 354.

Traditionally, Japanese patent application laid-open No. 2014-111456 (particularly, in FIG. 9 and FIG. 10) discloses a structure including an air conditioner main body in a rear portion of a ceiling part of a cabin covering a driver unit of a tractor; an outside air supply passage configured to supply outside air to the air conditioner main body; and an outside air introduction port configured to introduce the outside air to the outside air supply passage. The outside air supply passage is formed as a flat space in a midway portion of the ceiling part, and this flat space is communicated with the air conditioner main body via an open/close port, while the left rear portion of the ceiling part is formed in a hollow shape communicating with the flat space, and the outside air introduction port for introducing the outside air is formed in the left side rear portion of the ceiling part. In the outside air introduction port, a filter is equipped for removing dust in the outside air.

In the above-described traditional art however, the outside air introduction port and the outside air introduction port formed as a flat space are arranged close to each other. Therefore, the passage for supplying the air from the outside air introduction port to the air conditioner main body via the outside air supply passage is short. As the result, even though the filter is equipped in the outside air introduction port, the dust remains in the outside air, without being removed by the filter, and is supplied to the air conditioner main body. The dust in the outside air causes clogging in the blower fan (sirocco fan) provided in the air conditioner main body, thus leading to a problem of deterioration in the air blowing function.

In this regard, the above-described present embodiment can provide a work vehicle having a structure such that the dust contained in the outside air falls in the outside air supply passage in the process of supplying, and does not flow into the air conditioner main body.

[Structure of Blowing Out Cooled/Warmed Air from the Air Conditioner Main Body]

The following describes, with reference to FIG. 8 to FIG. 17, the structure of blowing out cooled/warmed air from the air conditioner main body 310. The air conditioner main body 310 arranged in the air conditioner main body arrangement part 270 includes: the main body casing 320; the evaporator 312 configured to generate cooled air in the main body casing 320; the heater core 316 configured to generate warmed air in the main body casing 320; and the blower fan 318 configured to suck in supplied outside air W4 or supplied internal air W6 into the main body casing 320, and feeding the air to the evaporator 312 or the heater core 316.

In the air conditioner main body 310, the supplied outside air W4 or the internal air W6 is turned into warmed/cooled air to be blown. In the duct arrangement portions 280, there are arranged warmed air ducts 480 and cooled air ducts 482 serving as a plurality of air feeding ducts (four, in the present embodiment) for conveying the warmed/cooled air generated in the air conditioner main body 310 to a desirable position.

The main body casing 320, the base end opening portions 484 and 486 of the plurality of warmed and cooled air ducts 480 and 482 are connected in an interlocking manner. The base end opening portion 484 is arranged nearby the heater core 316 and is capable of taking in warmed air, and the base end opening portion 486 is arranged nearby the evaporator 312 and is capable of taking in cooled air.

Each of the warmed air ducts 480 serving as an air feeding duct for supplying warmed air is extended in the front-rear direction in the ceiling part 250, and its leading end opening portion 488 is formed nearby the front window part 252 of the cabin C, to enable blowing of warmed air from the leading end opening portion 488 towards the front window part 252. On the other hand, each of the cooled air ducts 482 serving as an air feeding duct for supplying cooled air is extended in the front-rear direction in the ceiling part 250, and its leading end opening portion 490 is formed in a midway portion of the ceiling part 250, to enable blowing of cooled air from the leading end opening portion 490 towards an operator seated in the driver unit 20 in the cabin C.

On the left and right sides of the rearward conveying portion 374, a pair of the warmed air ducts 480 and a pair of the cooled air ducts 482 are arranged side-by-side. The pair of warmed air ducts 480 are arranged close to the rearward conveying portion 374 and cross immediately below the branch intake portions 372 in a three-dimensional crossing manner, and their leading end opening portions 488 are arranged nearby the front window part 252 of the cabin C. The pair of cooled air ducts 482 are arranged close to the upper beam pieces 208, and their leading end opening portions 490 are arranged nearby and immediately rearward of the branch intake portions 372.

The plurality of air feeding ducts, i.e., the warmed air duct 480 and the cooled air duct 482 arranged adjacent to each other on one side have their base end opening portions 484 and 486 arranged close to each other, and a feed amount adjustment member 492 is arranged nearby these base end opening portions 484 and 486 in a swing-adjustable manner. With this feed amount adjustment member 492, the feed amounts of warmed air and the cooled air are adjusted in a reciprocal manner.

More specifically, the pair of left and right, that is, two warmed air ducts 480 are each formed in a cylindrical shape extended in the front-rear direction, and configured to supply warmed air to the vicinity of the front window part 252. Further, the pair of left and right, that is, two cooled air ducts 482 are each formed in a cylindrical shape extended in the front-rear direction, and configured to supply cooled air to the side of the operator seated in the driver unit 20. These four ducts 480 and 482 are arranged symmetrically in the left-right direction.

Each of the warmed air ducts 480 is arranged nearby and along the inner side surface of the cooled air duct 482 and outward of the rearward conveying portion 374, and its leading end portion is extended close to the front window part 252. The leading end portion of the warmed air duct 480 is bent inward along the front window part 252, and the leading end opening portion 488 is provided in the leading end portion. The leading end opening portion 488 is connected to a front window side outlet portion 487 which is exposed to the inside of the cabin C from the front end portion of the inner ceiling piece 272, so as to enable blowing out of warmed air downward from the front window side outlet portion 487 along the inner surface of the front window part 252. In other words, the front window side outlet portion 487 is functionable as a defroster. The front portion of the warmed air duct 480 is connected to a front portion outlet portion 489 which is exposed to the inside of the cabin C from the front portion of the inner ceiling piece 272, so as to enable blowing out of air downward from the front portion outlet portion 489 at the front portion of the cabin C.

Each of the cooled air ducts 482 is arranged nearby and along the inner side surface of the upper beam piece 208, and its leading end portion is extended close to the branch intake portion 372. The leading end portion of the cooled air duct 482 has the leading end opening portion 490, and the leading end opening portion 490 is connected to an operator side outlet portion 491 which is exposed from the midway portion of the side edge of the inner ceiling piece 272 to the inside of the cabin C, so as to enable blowing out of cooled air from the operator side outlet portion 491 to the operator seated in the driver unit 20.

To the base end portions of the cooled air ducts 482 arranged on the left side portion and the right side portion in the cabin C have the base end opening portions 486 opened towards inside front. The base end opening portions 486 are each connected from a side to the side wall front portion of the main body casing 320 of the air conditioner main body 310. Further, the base end portions of the warmed air ducts 480 arranged adjacent to the cooled air ducts 482 have base end opening portions 484 opened towards the rear. The base end opening portions 484 are each connected from the front to the front side wall of the main body casing 320 of the air conditioner main body 310. The base end opening portions 484 of the warmed air ducts 480 and the base end opening portions 486 of the cooled air duct 482 are all formed in the same shape and same size, and one of the base end opening portions 484 and 486 is closed by a single feed amount adjustment member 492.

In the main body casing 320, an adjuster support shaft 494 whose axis is directed in the up-down direction is attached so as to be rotatable about its axis, between the outside portions where the base end opening portion 484 of the warmed air duct 480 and the base end opening portion 486 of the cooled air duct 482 are the closest. To this adjuster support shaft 494 the base end edge portion of the feed amount adjustment member 492, which is formed in a quadrangular plate, is attached. The feed amount adjustment member 492 is swing-adjustable about the adjuster support shaft 494, between a close position for closing the base end opening portion 484 of the warmed air duct 480 and a closing position for closing the base end opening portion 486 of the cooled air duct 482, and the feed amount adjustment member 492 reciprocally adjust the feed amounts of warmed air and cooled air to the base end opening portions 484 and 486 by its swing adjustment posture.

That is, when the feed amount adjustment member 492 closes (opens) the base end opening portion 484 of the warmed air duct 480, the base end opening portion 486 of the cooled air duct 482 is opened (closed), and the warmed air or the cooled air is fed only to the opened base end opening portion 486 (484). When the feed amount adjustment member 492 slightly opens (largely opens) the base end opening portion 484 of the warmed air duct 480, the base end opening portion 486 of the cooled air duct 482 largely opens (slightly opens). To the base end opening portion 486 (484) largely opened, a large amount of warmed air or cooled air is fed, while a small amount of warmed air or cooled air is fed to the slightly opened base end opening portion 484 (486). When the feed amount adjustment member 492 is positioned in the middle between the base end opening portion 484 of the warmed air duct 480 and the base end opening portion 486 of the cooled air duct 482, the same amount of warmed air or cooled air is fed to the base end opening portions 484 and 486.

The above described adjuster support shaft 494 and the feed amount adjustment member 492 are provided in the front end portions on the left and right sides of the main body casing 320, as a pair of left and right. Between the adjuster support shafts 494 on both sides, an adjuster drive mechanism 500 is interposed immediately above the main body casing 320.

The adjuster drive mechanism 500 includes: an eccentric cam driving motor 502 placed on the main body casing 320; an eccentric cam piece 504 in a shape of a deformed disc which is rotated by the eccentric cam driving motor 502; left and right swing mechanism 508 connected via an eccentric cam groove 506 formed in the peripheral edge portion of the eccentric cam piece 504; a pair of left and right push/pull rods 510 which are pushed/pulled in the left-right directions in response to a left/right swing operation of the left and right swing mechanism 508; and a pair of left and right front/rear swing arms 512 which is swung in the front and rear directions in response to the push/pull operation of the push/pull rods 510 on both sides. The base end portion of each front/rear swing arm 512 is attached to the upper end portion of the adjuster support shaft 494.

The eccentric cam driving motor 502 has a drive shaft 503 protruding upward. To the upper end portion of the drive shaft 503, the eccentric cam piece 504 of the deformed disc shape is eccentrically attached, so that the eccentric cam piece 504 is horizontally rotated. On the top surface of the eccentric cam piece 504 having the deformed disc shape, the endless eccentric cam groove 506 which is opened upward is formed along the peripheral edge portion.

The left and right swing mechanism 508 includes a first lever 514 arranged on the left side of the eccentric cam piece 504, a second lever 516 arranged on the further left, and a third lever 518 arranged on the right side of the eccentric cam piece 504. The first lever 514 has one end engaged with the eccentric cam groove 506, and its other end performs a left/right swing operation in response to rotating operation of the eccentric cam piece 504. The second lever 516 has one end connected to the other end of the first lever 514, and it other end reciprocally performs a left/right swing operation in response to the left/right swing operation of the other end of the first lever 514. The third lever 518 has one end engaged with the eccentric cam groove 506, and its other end performs a left/right swing operation in response to rotating operation of the eccentric cam piece 504. In other words, the other end of the second lever 516 and the other end of the third lever 518 reciprocally perform left/right swing operations.

The pair of left and right push/pull rods 510 are extended linearly in the left-right direction. The left side push/pull rod 510 has its inner side end connected to the other end of the second lever 516, and has its outer side end connected to the leading end of the left side front/rear swing arm 512. The right side push/pull rod 510 has its inner side end connected to the other end of the third lever 518, and has its outer side end connected to the leading end of the right side front/rear swing arm 512.

Therefore, the pair of left and right feed amount adjustment members 492 are swung in response to rotating operation of the eccentric cam piece 504, via the adjuster drive mechanism 500. At this time, the pair of left and right feed amount adjustment members 492 are swung symmetrically in the left-right direction.

At the back of the adjuster drive mechanism 500, air-feed passage changing means 520 is arranged. The air-feed passage changing means 520 includes a pair of left and right air-feed passage changers 522, and a changer drive mechanism 524 configured to swing both of the air-feed passage changers 522 symmetrically in the left-right direction.

The pair of left and right air-feed passage changers 522 are each formed into a quadrangular plate shape and arranged upright in an air-feed passage 526 formed on the left and right sides of the heater core 316. In a middle portion of each of the air-feed passage changers 522 arranged upright, a changer support shaft 528 whose axis is directed in the up-down direction is provided, and the changer support shaft 528 is pivotally installed to the main body casing 320 in such a manner as to pivot about its axis. Each of the air-feed passage changers 522 is capable of changing its posture between a closed posture in which its surfaces are directed in the front-rear directions to close the air-feed passage 526, and an inclined open posture in which the air-feed passage changer 522 is inclined by having its outside portion positioned forward while its inside portion positioned rearward, thereby opening the air-feed passage 526. The reference numeral 523 denotes flow-splitter in a quadrangular plate shape which splits the warmed air W8 and the cooled air W9 in the front-rear directions. The flow-splitter 523 is provided upright on the lower case forming piece 334, in the air-feed passage 526 on the left side, downstream of the air-feed passage changer 522.

The changer drive mechanism 524 includes: an arm drive motor 530; a left/right swing drive arm 534 whose base end portion is attached to the upper end portion of a drive shaft 532 protruded upward from the arm drive motor 530; and an interlocking mechanism 536 configured to change the posture of the pair of left and right air-feed passage changers 522, in response to the left/right swing operation of the left/right swing drive arm 534.

The interlocking mechanism 536 is arranged immediately above the main body casing 320. To the upper end portion of the changer support shaft 528 on the right side protruding upward from the main body casing 320, the base end portion of a first interlocking lever 538 and the base end portion of a second interlocking lever 540 are attached and are coaxially connected with each other. The leading end portion of the first interlocking lever 538 is pivotally connected with the leading end portion of the left/right swing drive arm 534. To the upper end portion of the changer support shaft 528 on the left side protruding upward from the main body casing 320, the base end portion of a third interlocking lever 542 is attached. Between the leading end portion of the third interlocking lever 542 and the leading end portion of the second interlocking lever 540, a connection rod 544 extended in the left-right direction is interposed.

When the left/right swing drive arm 534 is swung in left and right by the arm drive motor 530, the pair of left and right air-feed passage changers 522 changes their postures symmetrically in the left-right direction, via the interlocking mechanism 536, thereby changing the passage widths of the air-feed passages 526. That is, when the air-feed passage changers 522 are brought into the closed posture by which the air-feed passages 526 are closed, the blown air from the blower fan 318 entirely passes the evaporator 312 and the heater core 316, and is guided towards the warmed and cooled air ducts 482 on the left and right sides.

At this time, if generation of warmed air by the heater core 316 is stopped, while the evaporator 312 generates the cooled air, only the cooled air is guided towards the warmed and cooled air ducts 480 and 482 on the left and right sides. In other words, the cooled air is supplied also from the warmed air duct 480. To the contrary, if generation of cooled air by the evaporator 312 is stopped, while the heater core 316 generates the warmed air, only the warmed air is guided towards the warmed and cooled air ducts 480 and 482 on the left and right sides. In other words, the warmed air is supplied also from the cooled air duct 482.

Figure 17:
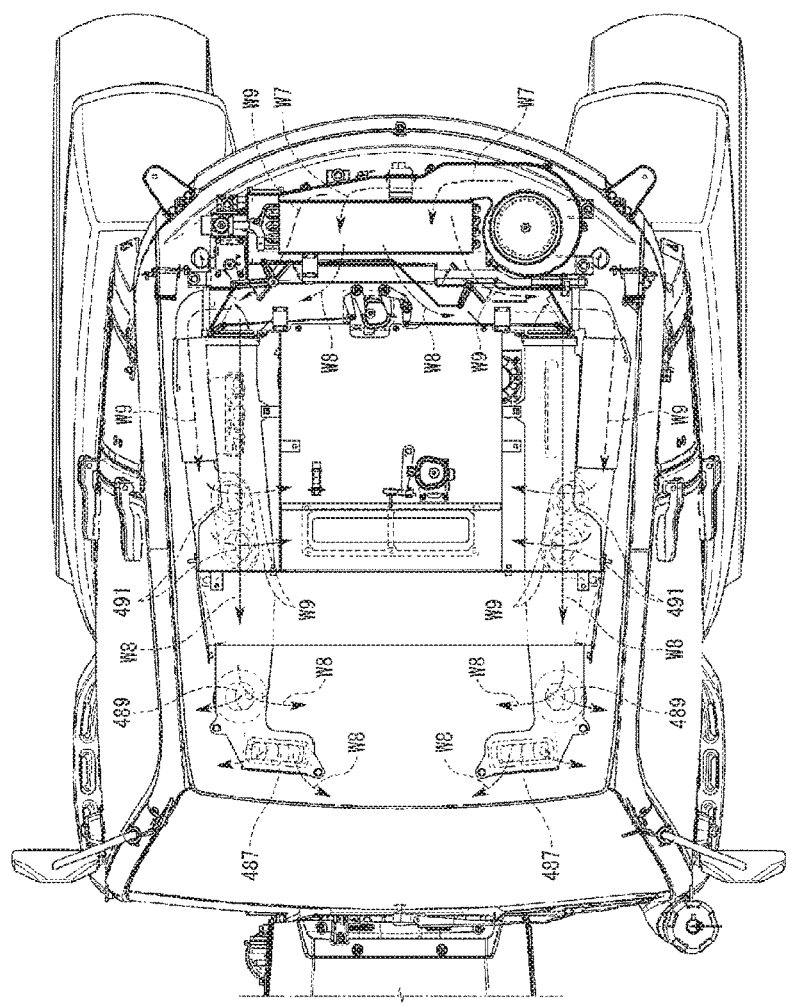
FIG. 17 An explanatory diagram showing blowing out of warmed/cooled air.
Figure 18:
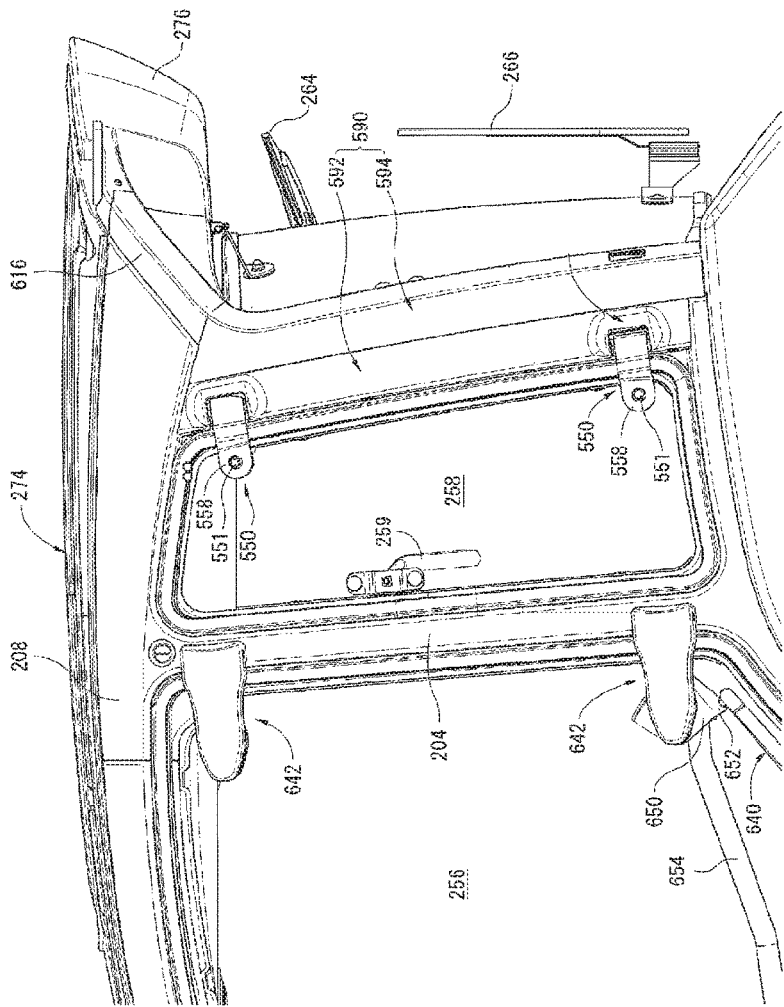
FIG. 18 A side view of a cabin rear portion.
Figure 19:
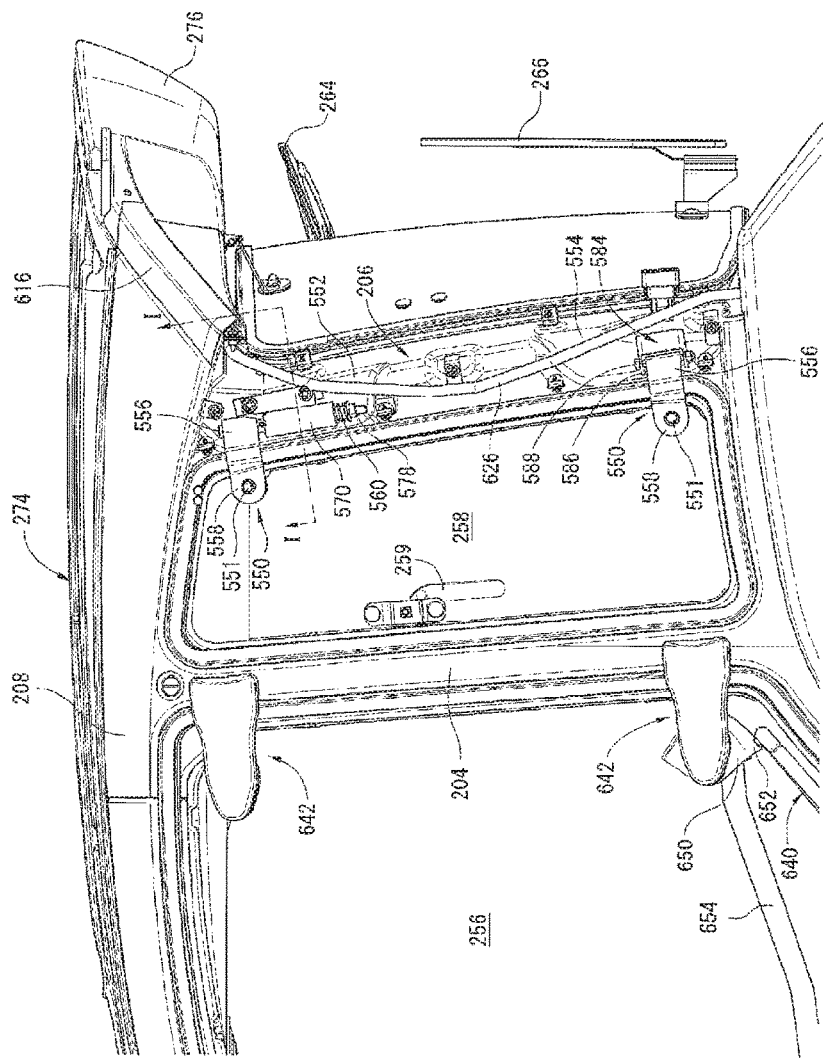
FIG. 19 An explanatory diagram providing a side view of the cabin rear portion in which a strut cover member is detached from the rear strut pieces.
Figure 20:
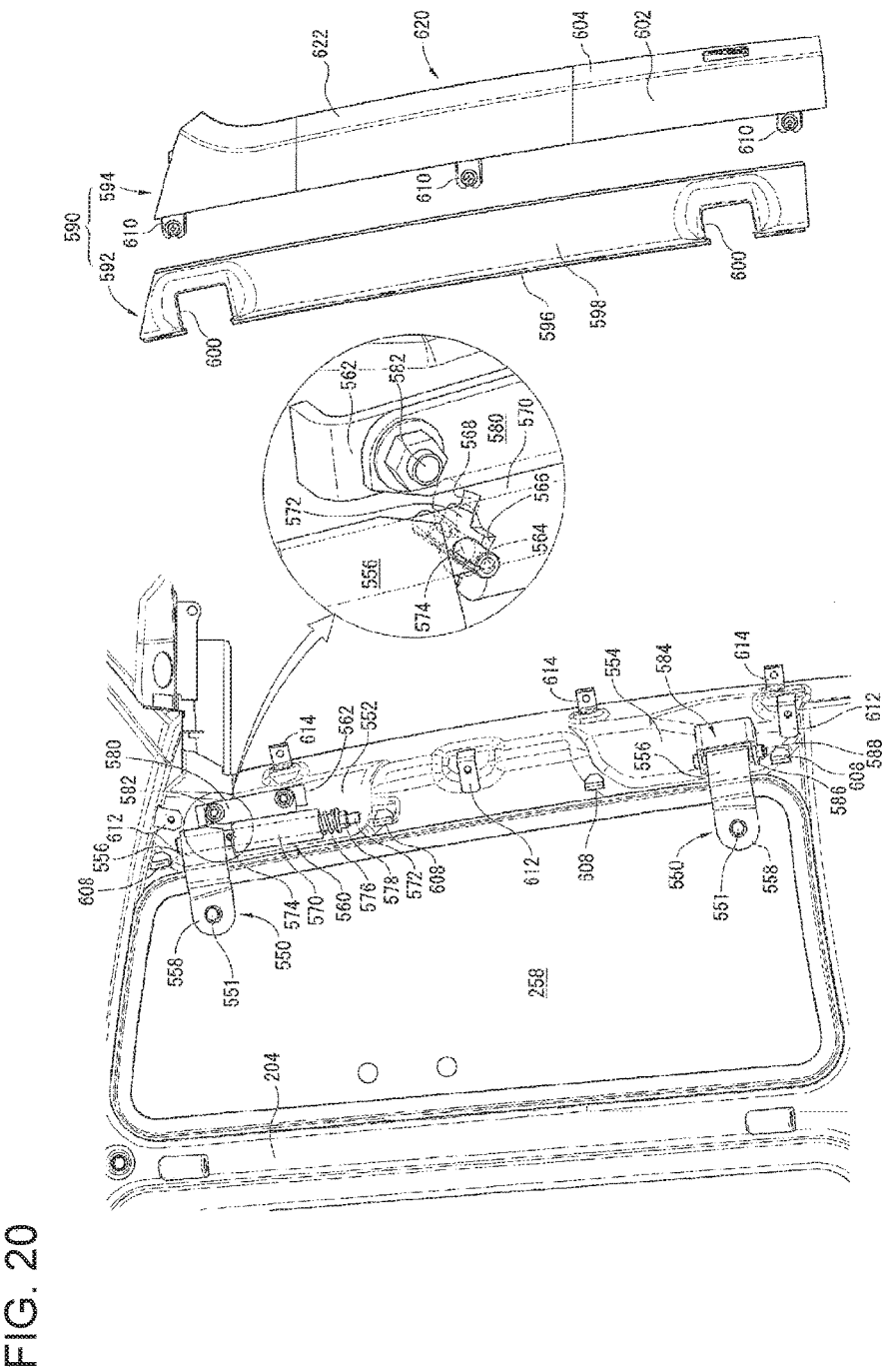
FIG. 20 An explanatory diagram providing a side view of the strut cover and the rear strut piece from which the strut cover member is detached.

When the air-feed passage changers 522 are brought into the inclined open posture by which the air-feed passages 526 are opened, the blown air W7 from the blower fan 318 partially passes the evaporator 312 and the heater core 316, and is guided towards the warmed and cooled air ducts 482 on the left and right sides, and the rest of the air passes the evaporator 312 and is directly guided towards the warmed and cooled air ducts 482 on the left and right sides, as shown in FIG. 17.

At this time, if the heater core 316 generates the warmed air W8 while the evaporator 312 generates the cooled air W9, the blown air partially passes the evaporator 312 and turned into the cooled air W9, and that cooled air W9 passes the heater core 316 to become warmed air, and that warmed air W8 is guided to the base end opening portion 484 of the warmed air duct 480.

Then, the warmed air W8 is blown out to the front portion of the cabin C, from the front window side outlet portion 487 and the front portion outlet portion 489, via the warmed air duct 480. The rest of blown air passes the evaporator 312 to become the cooled air W9 and that cooled air is directly guided to the base end opening portion 486 of the cooled air duct 482. Then, the cooled air W9 is blown out towards the operator in the cabin C, from the operator side outlet portion 491, via the cooled air duct 482.

In this case, the feed amount adjustment member 492 is synchronized with the posture changing operation of the air-feed passage changer 522 so as to be adjusted to open both the base end opening portion 484 of the warmed air duct 480 and the base end opening portion 486 of the cooled air duct 482.

As shown in FIG. 9, an operation unit 670 is provided in an upper right portion of the cabin C. The operation unit 670 includes: a start/stop switch 672 configured to start and stop the air conditioner device 300; a passage changeover switch 674 which performs changing over between the outside air circulation passage and the internal air circulation passage; a control period setting volume switch 676 which sets an air conditioner control period; an air-feed pattern setting volume switch 678 which sets an air-feed pattern; and a temperature setting volume switch 680 which sets the temperature of the cabin C.

The various switches and temperature sensor 350 arranged in the operation unit 670 are electrically connected to input ends of a control unit (not shown) having a computer function, and the output ends of the control unit are electrically connected to driving units for the expansion valve 314 and a valve and the like for supplying or stopping heated water to the heater core 316, the cam driving motor 422, the eccentric cam driving motor 502, and the like. By operating the various switches of the operation unit 670, the operation of the air conditioner device 300 is appropriately controlled through the control unit.

In the structure of blowing out the cooled/warmed air, the base end opening portions 484 and 486 of the plurality of air feeding ducts (the warmed air ducts 480 and the cooled air ducts 482) are connected in an interlocking manner to the main body casing 320. While the base end opening portion 484 of each warmed air duct 480 is arranged nearby the heater core 316 to enable taking in of warmed air, the base end opening portion 486 of each cooled air duct 482 is arranged nearby the evaporator 312 to enable taking in of cooled air. Therefore, air feeding ducts for separately feeding the warmed air and the cooled air can be arranged, and the warmed air or the cooled air can be blown out from desirable positions of the cabin C through the air feeding ducts.

Further, since the warmed air can be blown out towards the front window part 252, this warmed air can be functioned as a defroster. Further, since the cooled air can be blown out towards the operator seated in the driver unit 20 in the cabin C, the cooled air can prevent the operator from feeling dizzy due to heat in the warmed cabin C. In other words, a comfortable working environment that keeps operators head cool and his/her feet warm can be realized in the cabin C.

Further, the warmed air ducts 480 serving as a pair of air feeding ducts for supplying the warmed air are arranged close to the rearward conveying portion 374 and cross, in a three-dimensional crossing manner, immediately below the branch intake portions 372, and their leading end opening portions 488 are arranged nearby the front window part 252 of the cabin C. the cooled air ducts 482 serving as a pair of air feeding ducts for supplying the cooled air are arranged close to the upper beam pieces 208, and their leading end opening portions 490 are arranged nearby the branch intake portions 372. Therefore, the air supply duct 370 and the air feeding ducts are arranged compactly in the ceiling part 250. This way, the ceiling part 250 can be formed in a flat hollow plate shape, and a large residential space can be ensured in the cabin while restraining an increase in the vehicle height.

Further, since the feed amounts of the warmed air and the cooled air is reciprocally adjusted by the feed amount adjustment member 492, the feed amounts of the warmed air and the cooled air can be easily adjusted.

[Open/Close Pivot Structure of Side Window Part]

The following describes, with reference to FIG. 18 to FIG. 23, the open/close pivot structure for the side window parts 258. The pair of left and right side window parts 258 are provided on the left and right side surface portions framed by the pairs of left and right midway strut pieces 204, the rear strut pieces 206, the upper beam pieces 208, and the lower beam pieces 210, respectively, and are pivotally supported to open and close. Since the open/close pivot structures for the pair of left and right side window portions 258 are identical, the following describes the open/close pivot structure of the left side window part 258.

The side window part 258 has its rear end edge portion attached to the rear strut pieces 206 forming a part of the cabin frame 200 via a pair of upper and lower pivotally-supporting members 550, and the front end side is capable of opening outwardly and close. The rear strut piece 206 is formed in a cylindrical shape extended linearly in the up-down direction, and in the upper portion and the lower portion of its outside surface portion, an upper stepped recess portion 552 and a lower stepped recess portion 554 are formed, respectively. Each pivotally-supporting member 550 is formed in an elongated plate shape which is long in the front-rear direction. In the upper and lower stepped recess portions 552 and 554, base end portions 556 of the pivotally-supporting members 550 are arranged in a housing manner. To upper and lower positions of the rear end edge portion of the side window part 258, leading end portions 558 of the pivotally-supporting members 550 are attached by attachment bolts 551, so that the side window part 258 is pivotally supported through the pivotally-supporting members 550 in such a manner as to open and close. The reference numeral 259 denotes the side-window opening/closing handle attached to inner front portion of the side window part 258. Opening and closing operation of the side window part 258 can be performed from inside the cabin C through the side-window opening/closing handle 259.

The base end portion 556 of the upper pivotally-supporting member 550 is provided with a temporary stopper 560 configured to temporarily stop the pivotally-supporting member 550 at multiple open angles. With the pivotally-supporting member 550 having the temporary stopper 560, the side window part 258 can be temporarily stopped and opened at multiple open angles (in the present embodiment, two angles).

The temporary stopper 560 is arranged in a housed manner via an attachment bracket 562 in the upper stepped recess portion 552. The temporary stopper 560 is formed in a cylindrical shape with its axis directed in the up-down direction, and includes: a boss piece 570 having at its upper end surface portion a plurality of (three, in the present embodiment) engagement recesses portions 564, 566, and 568; a pivot piece 572 penetrating the boss piece 570; a pin-shaped engagement piece 574 projecting in a radial direction at the upper portion of the pivot piece 572, and engages with any one of the engagement recesses; and a press spring 576 wound about the outer circumferential surface of the lower portion of the pivot piece 572, which elastically biases the pivot piece 572 downward.

Each of the engagement recesses is formed by notching the upper end surface portion of the boss piece 570 in a V-shape so that the engagement piece 574 can fit therein. In the present embodiment, as the engagement recesses, a window-close position recess 564, a first window-open position recess 566, and a second window-open position recess 568 are formed continuously or apart from each other, in the circumferential direction of the boss piece 570. In the lower end portion of the pivot piece 572, a spring receiving piece 578 is attached. The lower end of the press spring 576 is abutted against the spring receiving piece 578, and the upper end of the press spring 576 is abutted against the boss piece 570. On the circumferential surface of the boss piece 570, a plate-form connection protrusion piece 580 extended in an axial direction of the boss piece 570 is protruded, and the boss piece 570 is attached to the attachment bracket 562 via the connection protrusion piece 580, by using attachment bolts 582.

The engagement piece 574 is elastically biased in a direction of engaging with the engagement recesses, via the pivot piece 572, by the press spring 576. Further, by rotating the pivot piece 572 about its axis, the engagement piece 574 can change its engagement with another engagement recess, against the elastic bias force.

More specifically, in the upper portion of the pivot piece 572, the upper portion of the rear side edge portion of the side window part 258 is attached via the upper pivotally-supporting member 550. Thus, when the side window part 258 is brought into the close position, by rotating it about the axis of the pivot piece 572 against the elastic bias force exerted by the press spring 576, the engagement piece 574 is elastically biased by the press spring 576 and engages with the window-close position recess 564, and the side window part 258 is kept in the close position.

Further, when the side window part 258 is brought into a first window-open position, by slightly rotating it about the axis of the pivot piece 572 in the opening direction against the elastic bias force exerted by the press spring 576, the engagement piece 574 is elastically biased and engages with the first window-open position recess 566, and the side window part 258 is kept in the first window-open position.

Further, when the side window part 258 is brought into the second window-open position, by rotating it more about the axis of the pivot piece 572 against the elastic bias force exerted by the press spring 576, the engagement piece 574 is elastically biased by the press spring 576 and engages with the second window-open position recess 568, and the side window part 258 is kept in the second window-open position. By suitably engaging the engagement piece 574 with the second window-open position recess 568 -->the first window-open position recess 566 -->the window-close position recess 564, the side window part 258 is kept in a desirable open/close position.

The base end portion 556 of the lower pivotally-supporting member 550 at the lower portion is pivotally connected to a window pivotally-supporting portion 584 arranged in the lower stepped recess portion 554. The window pivotally-supporting portion 584 is formed by bridging a shaft piece 588 pivotably about its axis to a shaft support piece 586 fixed in a housed manner in the lower stepped recess portion 554. To the shaft piece 588, the base end portion 556 of the lower pivotally-supporting member 550 is attached. The side window part 258 is pivotally connected to the window pivotally-supporting portion 584 via the lower pivotally-supporting member 550. The shaft piece 588 is arranged coaxially with the pivot piece 572 of the temporary stopper 560, and pivotally supports the side window part 258 through the upper and lower pivotally-supporting members 550 in such a manner as to enable opening and closing.

The upper pivotally-supporting member 550 attached to the pivot piece 572 of the temporary stopper 560 arranged in the upper stepped recess portion 552, and the lower pivotally-supporting member 550 attached to the shaft piece 588 of the window pivotally-supporting portion 584 arranged in the lower stepped recess portion 554 are formed by bending their rear portion inwardly, and both of the rear portions are covered by a later-mentioned strut cover member 590.

The outside surface portion of the rear strut piece 206 is covered by the strut cover member 590, and the outside surface of the strut cover member 590 is made substantially flush with the outside surface of the side window part 258 in the close state. The strut cover member 590 is formed by two parts: i.e., a front cover piece 592 and a rear cover piece 594. The front cover piece 592 extends in the up-down direction from the under surface of the upper beam piece 208 to the top surface of the lower beam piece 210, and includes a front surface piece 596 arranged to face the front-rear direction and a side surface piece 598 extended rearward from the left side edge portion of the front surface piece 596, forming an L-shaped cross section in plan view. An interference avoiding opening 600 is formed in the upper and lower portions of the front cover piece 592, and the front cover piece 592 and each pivotally-supporting member 550 are prevented from interfering with each other by the interference avoiding opening 600.

The rear cover piece 594 extends in the up-down direction from the under surface of the upper beam piece 208 to the top surface of the fender 29, and includes: an outside surface piece 602 arranged in such a manner as to be flush with the side surface piece 598; a rea surface piece 604 extended rearwardly and inwardly from the rear end edge portion of the outside surface piece 602, and an inside surface piece 606 extended from the inside edge portion of the rea surface piece 604 towards the rear surface portion of the rear strut piece 206, so as to form a substantially U-shaped cross section in plan view.

The rear strut piece 206 includes: front surface piece connecting brackets 608 each connecting with the front surface piece 596 of the front cover piece 592; outside surface piece connecting brackets 612 which connect with connection protrusions 610 protruding forward from the front end edge portion of the outside surface piece 602 of the rear cover piece 594; and inside surface piece connecting brackets 614 connecting with the inside surface piece 606 of the rear cover piece 594. The rear end edge portion of the side surface piece 598 of the front cover piece 592 and the front end edge portion of the outside surface piece 602 of the rear cover piece 594 are connectable by being engaged with each other. Between the upper end portion of the rear cover piece 594 and the left side portion of the rear ceiling piece 276, the beam piece cover member 616 is detachably interposed so as to cover the outside air introduction port 354 from immediately behind. By detaching the beam piece cover member 616 as needed, maintenance and the like for the outside air filter 355 attached to the outside air introduction port 354 via the filter case 356 is easily performed.

Inside the strut cover member 590, a combination lamp 620 is provided. This combination lamp 620 makes it possible to perform a plurality of lamp indications rearward. The combination lamp 620 is a lamp integrally including a plurality of lamps such as a brake lamp, a blinker lamp, a back lamp, and a tail lamp, and includes a light emitter (not shown) such as a light emitting diode (LED) and a translucent window 622 forming a midway portion of the strut cover member 590. Desirable lamp indications are enabled as needed by emitting light rearward from the light emitter through the translucent window 622.

Between the outer surface portion of the rear strut pieces 206 and the inner surface portion of the strut cover member 590, an arrangement space 624 extended in the up-down direction is formed. The arrangement space 624 can accommodate therein piping for transferring fluid and wiring for transmitting current. In the present embodiment, a first drain hose 626 whose base end portion is connected to the main body casing 320 is arranged in the arrangement space 624. The first drain hose 626 has its midway portion extended downward in the arrangement space 624, and its leading end arranged along the inside surface of the fender 29 and opened towards outside of the machine.

Further, in the arrangement space 624, electric wires for transmitting current to the light emitter are arranged. The left side rear strut piece 206 formed in a cylindrical shape has therein the ejection side warm water pipe 326 and the returning side warm water pipe 328 forming the warm water pipe 324 connected to the heater core 316 are arranged, and a second drain hose 627. The second drain hose 627 has its midway portion extended downward in the rear strut piece 206, and its leading end arranged along the outside surface of the lower beam piece rear portions 214 and is opened downward from the rear portion of the lower beam piece front portion 212 to the outside of the machine. It should be noted that the first drain hose 626 and a washer pipe (not shown) are provided in an arrangement space 624 on the right side. The rear strut piece 206 on the right side formed in a cylindrical shape has therein the refrigerant pipe 322 and the second drain hose 627.

Rear frame members 628 forming the left and right side rear portions of the cabin frame 200 include: a rear outside half portion 630 of the upper beam piece 208 extended in the front-rear direction; the lower beam piece rear portion 214 curved to form upward convex; the midway strut piece 204 extended in the up-down direction; and the rear strut piece 206 extended in the up-down direction, which are integrally formed in a shape resembling to a symbol "#" in a side view. The reference numeral 632 denotes an inside half portion of the upper beam piece 208, and the reference numeral 634 denotes the terminal end forming wall which forms the terminal end of the outside air introduction passages 362.

To the midway strut piece 204, the boarding door part 256 is attached in such a manner as to open and close, via a door pivotally-supporting member 648. The rear end portion of the lower beam piece front portion 212 curved to form an upward convex, and the front end portion of the lower beam piece rear portion 214 are engaged with each other in the front-rear directions. In this position of engagement, the leading end of the open/close support means 640 whose base end portion is attached to the boarding door part 256, and opening and closing of the boarding door part 256 are supported by the open/close support means 640.

The boarding door part 256 is attached to the midway strut piece 204 in such a manner as to open and close, via a pair of upper and lower door pivotally-supporting portions 642. Each of the door pivotally-supporting portions 642 is formed by a door side connector 644 attached to the inner surface rear edge portion of the boarding door part 256, a strut piece side pivotally supporting connector 646 protruding from the midway strut piece 204, and the door pivotally-supporting member 648 interposed between both connectors 644 and 646.

The door pivotally-supporting member 648 has its leading end (front end portion) connected to the door side connector 644, and its base end portion (rear end portion) pivotally connected to the strut piece side pivotally supporting connector 646 in such a manner as to pivot about an axis extended in the up-down direction. The lower door side connector 644 is formed by a plate-shaped surface contact piece 650 which surface-contacts with the boarding door part 256, and a rear portion protruding piece 652 protruding inward from the lower end edge portion of the surface contact piece 650.

On the inside surface of the surface contact piece 650, the rear end portion of a boarding door open/close handle 654 extended in the front-rear direction is attached. To the under surface of the rear portion protruding piece 652, the base end portion 658 of the open/close support means 640 is attached. To the front end portion of the rear portion of the lower beam piece 210, a front portion protruding piece 656 protruding inward is integrally formed, and the leading end portion 660 of the open/close support means 640 is attached to the front portion protruding piece 656 The open/close support means 640 may be, for example, a gas spring extended in the front-rear direction may be adopted. The gas spring expands and contracts when opening and closing the boarding door part 256, thereby reducing the resistance of opening/closing the boarding door part 256, i.e., supporting opening/closing of the boarding door part 256.

In the open/close pivot structure of the side window parts 258 as described above, the upper stepped recess portion 552 and the lower stepped recess portion 554 are formed on the outside surface portion of the rear strut piece 206. In each of the stepped recess portions 552 and 554, the base end portion 556 of the pivotally-supporting member 550 is arranged. Meanwhile, the leading end portions 558 of the pivotally-supporting members 550 are attached to the upper and lower portions of the rear end edge portion of the side window part 258. Through these pivotally-supporting members 550, the side window part 258 is able to open and close. The outside surface portion of the rear strut piece 206 is covered by the strut cover member 590. The outside surface of the strut cover member 590 is formed to be substantially flush with the outside surface of the side window part 258 in the closed state. Therefore, the aesthetic appearance of the cabin C, in particular the rear strut pieces 206, can be improved. Further, the rear strut pieces 206 can pivotally support the side window parts 258 in such a manner that the side window parts 258 can largely opened.

Each of the side window parts 258 can be opened in a plurality of steps of open angles (in the present embodiment, two steps) through the pivotally-supporting member 550 provided to the temporary stopper 560. Therefore, the side window part 258 can be opened in a stepwise manner to a desirable open angle that suits the operator's preference.

Further, the combination lamp 620 is provided. This combination lamp 620 makes it possible to perform a plurality of lamp indications rearward. This can improve the aesthetic appearance of the rear portion of the cabin C, and improve the safety by providing the combination lamp 620 at a height of the strut cover member 590 which is easily visible from the back.

Further, in the arrangement space 624 formed and extended in the up-down direction between the outer surface portion of the rear strut pieces 206 and the inner surface portion of the strut cover member 590, piping for transferring fluid and wiring for transmitting current can be accommodated. Therefore, the piping and wiring can be arranged compact by efficiently utilizing the arrangement space 624, and the external appearance of the rear portion of the cabin C can be improved.

Further, rear frame members 628 forming the left and right side rear portions of the cabin frame 200 are integrally formed. Therefore, manufacturing costs can be reduced by reducing the number of parts, and the strength and the external appearance of the rear portion frame members 628 can be improved.

Further, the rear end portion of the lower beam piece front portion 212 curved to form an upward convex, and the front end portion of the lower beam piece rear portion 214 are engaged with each other in the front-rear directions. In this position of engagement, the leading end of the open/close support means 640 whose base end portion is attached to the boarding door part 256 is connected. Therefore, the strength for this connected part can be ensured.

[Other Structures of Tractor]
Next, the following describes other structures of the tractor A.

Figure 24:
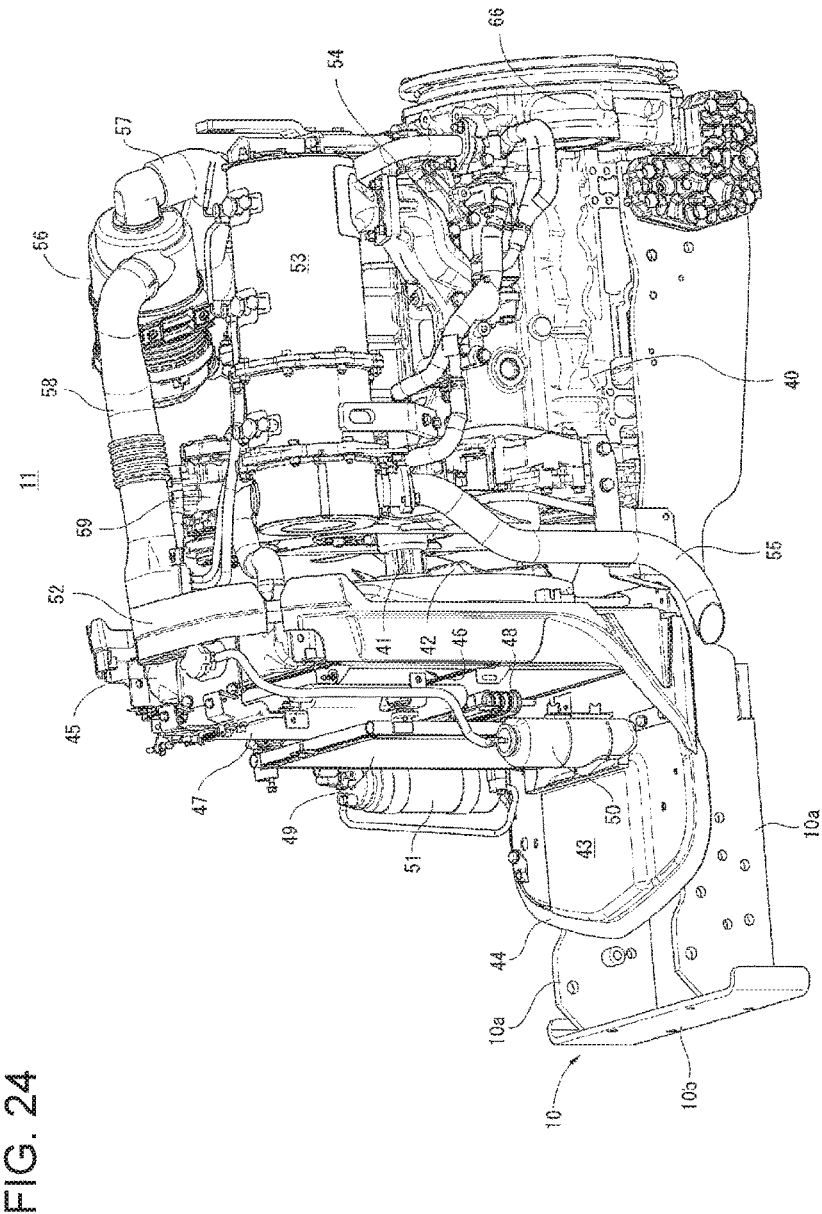
FIG. 24 An explanatory diagram providing a perspective view of a motor unit.

(Structure of Motor Unit)
As shown in FIG. 24, the motor unit 11 is structured by arranging the engine 40 and the like in the front portion of the machine frame 10. That is, the machine frame 10 is formed by the front portion of the machine frame 10 supporting the motor unit 11, and the rear portion of the machine frame 10 supporting the driver unit 20.

In the front portion of the machine frame 10, a pair of left and right belt-like forward front-rear direction extending pieces 10a are arranged to face each other, apart from each other by a certain distance in the left-right direction. Between front ends of both of the forward front-rear direction extending pieces 10a, a laterally elongated piece 10b formed in a plate-shape which is elongated in the left-right direction is laterally bridged.

In the rear portion of the machine frame 10, a pair of left and right belt-like rearward front-rear direction extending pieces 10c (see FIG. 1) are arranged to face each other, apart from each other by a certain distance in the left-right direction. Between front portions of both of the rearward front-rear direction extending pieces 10c, a traversing piece 10d (see FIG. 25) formed in a U-shape in a rear view is laterally bridged.

In the rear end portions of the pair of left and right forward front-rear direction extending pieces 10a, the front end portions of the pair of left and right rearward front-rear direction extending pieces 10c are overlapped from outside and are integrally connected. Between the rear end portions of the pair of left and right rearward front-rear direction extending pieces 10c, the front portion of the transmission case 12 is interposed and connected.

The engine 40 which is the main structuring member has its lower portion fitted and mounted between the rear portions of the pair of left and right forward front-rear direction extending pieces 10a. At the rear end portion of the engine 40, a clutch housing 66 is integrally formed. Directly forward of the engine 40, a cooling fan 42 is interlockingly connected via a fan shaft 41 whose axis is oriented in the front-rear direction.

Between the front portions of the pair of left and right forward front-rear direction extending pieces 10a, a support plate 43 is placed in a bridging manner, and a radiator 45 and the like are supported on the support plate 43. The front end edge portion 44 of the support plate 43 is formed in a mountain shape that matches with a lower end edge front portion of the later-described engine hood 80, thereby supporting the engine hood 80 in the closed state.

Directly forward of the cooling fan 42, the radiator 45 provided upright on the rear portion of the support plate 43 so as to face the cooling fan 42. Directly forward of the radiator 45, a radiator screen 46 for preventing adhesion of dirt and dusts to the radiator is arranged so as to cover the front surface of the radiator 45. In an upper part and lower part directly forward of the radiator screen 46, an oil cooler 47 and a fuel cooler 48 are arranged, respectively. Directly forward of these coolers 47 and 48, the air conditioner condenser 49 is arranged. On the left side and right side directly forward of the condenser 49, a sub tank 50 and the receiver dryer 51 are arranged. On the rear portion of the support plate 43, a gate-shape support member 52 formed in a shape of a gate in a front view is provided upright so as to surround the left, right, and upper sides of the radiator 45. With this gate-shaped support member 52, piping and the like are supported.

A diesel-particulate filter (hereinafter abbreviated as "DPF") 53 formed in a cylindrical box shape whose axis is oriented in the front-rear direction is disposed at a position directly above the left side of the engine 40. The rear end portion of the DPF 53 is connected and communicated with an exhaust port portion of the engine 40 via an exhaust pipe 54. To the front end portion of the DPF 53, the base end portion of a tail pipe 55 is connected and communicated, and the leading end portion of the tail pipe 55 is opened towards the lower left side.

In a directly above position of the rear portion on the right side of the engine 40, there is arranged an air cleaner 56 which is connected and communicated to inlet port portion of the engine 40 via a base end side intake pipe 57. The air cleaner 56 is connected and communicated to a leading end side intake pipe 58, and its leading end portion is fixed to the upper right portion of the gate-shaped support member 52 and opened forward. In a directly above position of the front portion on the right side of the engine 40, the air conditioner compressor 59 is arranged. The compressor 59 is interlockingly connected to the fan shaft 41 via an interlocking belt mechanism.

Figure 25:
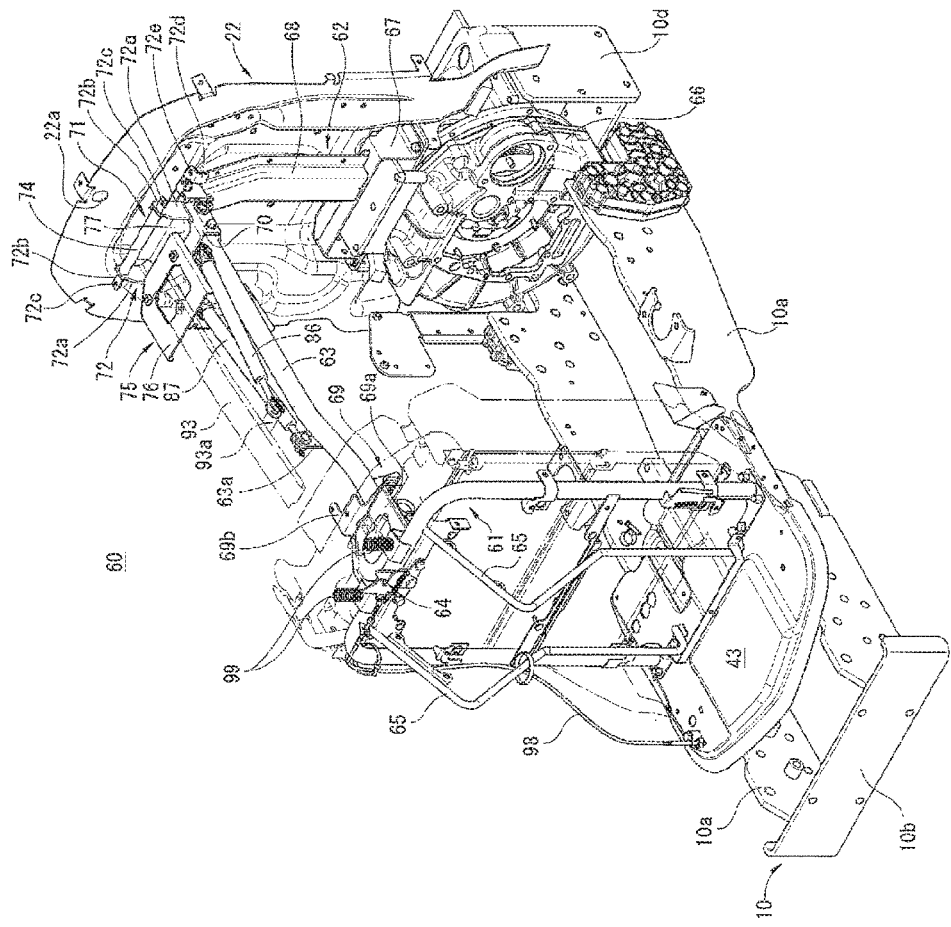
FIG. 25 An explanatory diagram providing a perspective view of a hood support body frame.

(Structure of Engine Hood Support Body Frame)
In the motor unit 11 having the above-described structure, an engine hood support body frame 60 as a front portion reinforcing member is provided as shown in FIG. 25. To the engine hood support body frame 60, the engine hood 80 is attached in such a manner as to open and close, so that the motor unit 11 can be opened and closed by the engine hood 80.

The engine hood support body frame 60 is formed by a front frame 61, a rear frame 62, and an intermediate frame 63. The front frame 61 is formed in a gate-like vertically elongated quadrangular shape in a front view, and is provided upright on the support plate 43, in such a manner as to surround the upper, left, and right sides of the oil cooler 47 and the fuel cooler 48. In the upper portion of the front frame 61, an engine hood locking mechanism 64 is provided. On the support plate 43, a pair of left and right auxiliary frames 65 are provided upright directly forward of the front frame 61. The upper end portions of both of the auxiliary frames 65 are connected to the upper end portion of the front frame 61.

The rear frame 62 includes a support base 67 placed above the clutch housing 66 formed in the rear end portion of the engine 40, and a support main piece 68 rising upward in a standing manner from the support base 67. The intermediate frame 63 is formed in a pipe shape having a circular cross section, which extends in the front-rear direction. The front end portion of the intermediate frame 63 is connected to the upper middle portion of the front frame 61 via a connecting member 69. The rear end portion of the intermediate frame 63 is connected to the upper end portion of the support main piece 68 via a support member 70.

On the support member 70, a pivotally-supporting portion 71 which pivotally support the engine hood 80 in such a manner as to open and close is provided. The connecting member 69 includes a front side connecting piece 69a protruding rearward from the upper middle portion of the front frame 61 over the upper end surface of the radiator 45, and a rear side connecting piece 69b attached in a crossing manner to the front end portion of the intermediate frame 63, which are butt-connected in the front-rear direction at a position above the back surface of the radiator 45. The connecting member 69 supports the upper end portion of the radiator 45 provided upright on the support plate 43.

The pivotally-supporting portion 71 includes: a pivotally-supporting piece 72 formed in a U-shape in a front view; a pivot shaft (not shown) with its axis directed in the left-right direction, which is laterally bridged between the upper end portions of the pivotally-supporting piece 72; a boss portion 74 rotatably fitted around the pivot shaft, and an open/close arm 75 whose base end edge portion is attached to the boss portion 74. The open/close arm 75 has its arm front portion 76 formed in a quadrangular ring-plate shape, and its arm rear portion 77 curved downward to form a U-shape in a side view. The arm rear portion 77 has its rear end edge portion pivotally supported by the pivot shaft via the boss portion 74, and its front end edge portion integrally connected to the rear end edge portion of the arm front portion 76. Further, to the arm front portion 76, the rear end portion of the engine hood 80 is attached via a front-rear extended frame 93 by using a connecting bolt 78.

Therefore, the engine hood 80 can be opened by rotating its front end side upward about the pivot shaft as the engine hood fulcrum. The arm rear portion 77 of the open/close arm 75 curved downward prevents the rear end edge portion of the engine hood 80 from interfering a later-described waste heat cover 30 covering directly above the pivot shaft, thereby preventing hinderance to the opening operation of the engine hood 80.

To each of the upper end portions of the pair of left and right rising pieces 72a forming a part of the pivotally-supporting piece 72, a cover-front-portion attaching piece 72b is protruded outward. To the cover-front-portion attaching piece 72b, a cover-front-portion attaching hole 72c is opened in the up-down direction. In the rear portion on each of the left and right sides of the support member 70, a cover-rear-portion attaching piece 72d is protruded. To the cover-rear-portion attaching piece 72d, a cover-rear-portion attaching hole 72e is opened in the up-down direction. Through these attaching pieces 72b and 72d, the later-described waste heat cover 30 is attached.

(Structure of Engine Hood)

As shown in FIG. 1 and FIG. 2, the engine hood 80 is formed in a box shape which is opened downward and rearward, by a ceiling surface portion 81 formed in the shape of an inverted bilge (so-called bilge-shaped ceiling), a mesh-like front surface portion (front grille) 82, and left and right side surface portions 83, 83, and can open and close the mast part of the motor unit 11 through the pivotally-supporting portion 71. In other words, the engine hood 80 is formed in a full-open type. Portions that can not be covered by the engine hood 80, i.e., the remaining lower portions on the left and right sides of the motor unit 11 are slightly covered by a pair of left and right side covers 84 each formed in a flat arch shape. The side covers 84 are each fixed to the engine hood support body frame 60. The reference numeral 84a denotes multiple ventilation holes formed and aligned on the side covers 84.

The ceiling surface portion 81 is formed by a flat ceiling surface 81a, and right and left side surfaces 81b, 81b curved to bulge outwardly in a hanging manner, at the left and right side edge portions and the front end edge portion of the ceiling surface 81a. In the upper portions on the left and right sides of the front surface portion 82, a pair of left and right front headlamps 85 are attached. Inside the ceiling surface portion 81, the hood reinforcing frame 90 is provided.

(Structure of Hood Reinforcing Frame)

Figure 26:
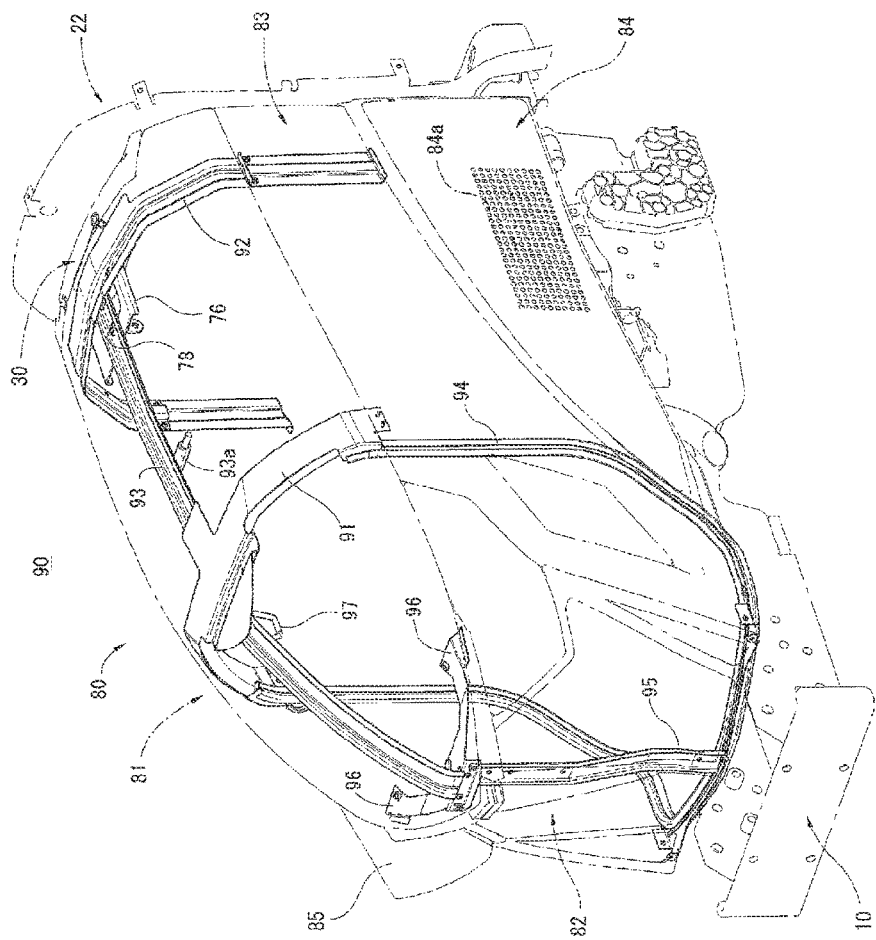
FIG. 26 An explanatory diagram providing a perspective view of a hood reinforcing frame.

As shown in FIG. 26, in the hood reinforcing frame 90, a front gate-shaped frame 91 and a rear gate-shaped frame 92 curved in the left-right direction along the front portion and the rear portion of the inner surface of the engine hood 80. In a middle portion of the inner surface of the ceiling surface portion 81, the front-rear extended frame 93 formed by extending it in the front-rear direction along the inner surface is attached to cross the gate-shaped frames 91, 92. On the left and right end portions of the front gate-shaped frame 91, a left and right side edge portions formed along the gate-shaped support member 52 and a front edge portion formed along the front end edge portion 44 of the support plate 43 form a curved reinforcing frame 94 which is in a U-shape in a front view. Between the middle portion of the curved reinforcing frame 94 and the front end portion of the front-rear extended frame 93, a front end linear frame 95 is interposed in a bridging manner. In the front end portion of the front-rear extended frame 93, a protruding frame 96 protrudes towards the left and right sides along the front inner surface of the left and right side surfaces 81b, 81b. These frames 91 to 96 reinforce the engine hood 80 from the inside.

A lock-target piece 97 is provided on the ceiling surface portion 81 in a closed state directly above the engine hood locking mechanism 64, via the front-rear extended frame 93. When the lock-target piece 97 is locked by the engine hood locking mechanism 64, the engine hood 80 is kept in the closed state. When the locking state of the lock-target piece 97 by the engine hood locking mechanism 64 is released, the engine hood 80 becomes openable. The locking and releasing operations of the engine hood locking mechanism 64 is done via the wire 98 at a portion below the right front portion of the support plate 43. The reference numeral 99 denotes a pair of left and right press springs provided in the upper portion of the front frame 61, and the press springs 99 biases the engine hood 80 upward, i.e., in its opening direction.

Between a first connecting piece 93a provided in the midway portion of the front-rear extended frame 93 of the hood reinforcing frame 90 and the rear portion of the intermediate frame 63 of the engine hood support body frame 60, a one-way gas damper 86 is interposed as one supporting means. Between a second connecting piece 63a provided in the front portion of the intermediate frame 63 and the arm front portion 76 of the open/close arm 75, an other-way gas damper 87 is interposed as another support means. While the one-way gas damper 86 is interposed so as to assist easy opening of the engine hood 80, the other-way gas damper 87 is interposed so as to assist easy closing of the engine hood 80.

Between the engine hood 80 and the cabin C covering the motor unit 11 as described above, a waste heat cover 30 having a waste heat hole 34 is interposed. This way, the heat generated in the motor unit 11 is radiated outside the machine through the waste heat hole 34. The reference numeral 35 denotes a waste heat cover arrangement recess portion formed in the rear end edge portion of the ceiling surface portion 81 of the engine hood 80, and the waste heat cover 30 is arranged in a fitting manner in the waste heat cover arrangement recess portion 35.

REFERENCE SIGNS LIST

A tractor
C cabin
10 machine frame
11 motor unit
12 transmission case
20 driver unit
222 main body support member
250 ceiling part
270 air conditioner main body arrangement part
310 air conditioner main body
330 attachment stay
354 outside air introduction port
360 outside air supply passage
362 outside air introduction port
364 air supply passage
370 air supply duct
480 warmed air duct
482 cooled air duct
552 upper stepped recess portion
554 lower stepped recess portion
590 strut cover member

The invention claimed is:
1. A work vehicle, wherein:
an air conditioner main body arrangement part for arranging therein an air conditioner main body is provided in a ceiling part of a cabin covering a driver unit, in such a manner that the air conditioner main body arrangement part protrudes rearward from a pair of left and right rear strut pieces of the cabin;
the air conditioner main body arrangement part includes a main body support member protruding rearward, which is provided to an upper rear beam piece laterally bridged between upper end portions of the pair of left and right rear strut pieces;
the main body support member has support rigidity to support the air conditioner main body from below;
the main body support member enables attachment of the air conditioner main body from above;
the main body support member includes a horizontal protruding surface portion which is integrally formed by rigid thin sheet metal in such a manner as to horizontally protrude, and a rising surface portion which rises upward from a rear end edge portion of the horizontal protruding surface portion; and
the rising surface portion has a plurality of attachment stays horizontally protruding inward, thereby enabling attachment of the air conditioner main body from above via the plurality of stays in a bridging manner.

2. The work vehicle according to claim 1, wherein:
the air conditioner main body includes an arrangement, in a main body casing, comprising at least devices for generating cooled air and warmed air;
side walls of the main body casing have a plurality of outwardly protruding attachment pieces facing the attachment stays; and
each of the attachment pieces is overlapped in an up-down direction with a corresponding one of the attachment stays, and an attachment bolt is penetrated and screwed in the overlapping portion, in the up-down direction, thereby enabling attachment of the air conditioner main body from above to the attachment stays in a bridging manner, via the attachment pieces.

3. The work vehicle according to claim 2, wherein a space is formed between the main body support member and the air conditioner main body attached to the main body support member in a bridging manner, via the attachment stays and attachment pieces.

4. An apparatus comprising:
a cabin frame defining a cabin of a work vehicle having a front end and a rear end, the cabin frame comprising a left front strut, a right front strut, a left rear strut, a right rear strut, the cabin frame having a front portion corresponding to the front end and a rear portion corresponding to the rear end; and
an air conditioner main body arrangement part coupled to the cabin frame, the air conditioner main body arrangement part comprising:
a rear beam piece extending from the left rear strut to the right rear strut;
a main body support member configured to support a bottom surface of an air conditioner main body, the main body support member extending from the rear beam toward the rear end of the work vehicle; and
an attachment stay extending from a top portion of the main body support member toward an interior of the cabin, the attachment stay configured to be coupled to a top surface of the air conditioner main body.

5. The apparatus according to claim 4, wherein:
the cabin frame further comprising an upper left beam extending in a rear direction from the left front strut to the left rear strut; and
the air conditioner main body is disposed within a cavity associated with a ceiling of the cabin frame.

6. The apparatus according to claim 5, wherein the main body support member comprises:
a horizontal surface portion defining a front end and a rear end, the horizontal surface portion extending horizontally in the rear direction from the front end to the rear end; and
a rising surface portion extending vertically from the rear end of the horizontal surface portion.

7. The apparatus according to claim 6, wherein air conditioner main body arrangement part comprises:
multiple attachment stays that include the attachment stay, each of the multiple attachment stays extend from the rising surface portion toward an interior of the cabin.

8. The apparatus according to claim 7, further comprising:
a main body casing of the air conditioner main body and comprising one or more attachment pieces, each of the one or more attachment pieces extending from the main body casing toward the main body support member.

9. The apparatus according to claim 8, wherein the multiple attachment stays and the one or more attachment piece define at least one bridge that is interposed between the main body support member and the air conditioner main body.

10. The apparatus according to claim 9, wherein:
at least one of the one or more attachment pieces defines a first opening; and
at least one of the one or more attachment stay defines a second opening.

11. The apparatus according to claim 10, wherein a bolt extends through the first opening and the second opening.

12. An apparatus comprising:
an air conditioner main body arrangement part coupled to a cabin frame of a work vehicle having a front end and a rear end opposite the front end, the air conditioner main body arrangement part comprising:
a main body support member coupled to a left rear strut and a right rear strut of the cabin frame and extending away from the cabin toward the rear end of the work vehicle, the main body support member comprising:
a horizontal surface portion defining a first end and a second end, the first end positioned intermediate the left rear strut and the right rear strut of the cabin frame, and the second end extends away from the first end toward the rear end of the work vehicle; and
a rising surface portion extending vertically from the second end of the horizontal surface portion.

13. The apparatus according to claim 12, wherein the main body support member is configured to support a bottom portion of the air conditioner main body.

14. The apparatus according to claim 13, wherein the main body support member is configured to be coupled to a top portion of the air conditioner main body via an attachment member coupled the rising surface portion.

15. The apparatus according to claim 14, wherein:
the rising surface portion comprises one or more attachment stays protruding toward the front end of the work vehicle; and
a plurality of attachment stays are configured to attach a top surface of an air conditioner main body to the main body support member.

16. The apparatus according to claim 15, further comprising:
the air conditioner main body comprising a main body casing configured to surround an air conditioner main body, the main body casing comprising:
a lower case;
an upper case; and
one or more attachment pieces configured to be coupled to the plurality of attachment stays.

17. The apparatus according to claim 16, wherein:
the main body support member defines a cavity; and
the main body casing is disposed within the cavity defined by the main body support member.

18. The apparatus according to claim 17, wherein:
the main body casing is positioned apart from the main body support member to define a gap between the main body casing and the main body support member; and
the plurality of attachment stays extend between the main body support member to the main body casing to span the gap.

* * * * *